US012099765B1

(12) United States Patent
Moskal et al.

(10) Patent No.: US 12,099,765 B1
(45) Date of Patent: Sep. 24, 2024

(54) METHOD AND SYSTEM FOR INTELLIGENT OPTIMIZATION OF DOCUMENT CONVERSION ENGINE SELECTION

(71) Applicant: Xerox Corporation, Norwalk, CT (US)

(72) Inventors: Cynthia Moskal, Walworth, NY (US); Dheeraj Thotakura, Macedon, NY (US); Surya Prakash Kotha, Norwalk, CT (US); Prince Gerald Albert, Webster, NY (US); Srinivasan Kottaiyappan, Irving, TX (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 18/240,582

(22) Filed: Aug. 31, 2023

(51) Int. Cl.
*G06F 3/12* (2006.01)

(52) U.S. Cl.
CPC .......... *G06F 3/1247* (2013.01); *G06F 3/1204* (2013.01); *G06F 3/1273* (2013.01)

(58) Field of Classification Search
None
See application file for complete search history.

(56) References Cited

U.S. PATENT DOCUMENTS

| 8,179,549 | B1* | 5/2012 | Evans | H04N 1/00217 |
| | | | | 358/1.15 |
| 2017/0277984 | A1* | 9/2017 | Person | G06F 40/12 |
| 2022/0100703 | A1* | 3/2022 | Mietke | G06F 16/1794 |
| 2022/0309634 | A1* | 9/2022 | Atwood | G06V 10/82 |
| 2023/0221708 | A1* | 7/2023 | Liu | B33Y 50/00 |
| | | | | 700/109 |

* cited by examiner

*Primary Examiner* — Helen Zong
(74) *Attorney, Agent, or Firm* — Lippes Mathias LLP

(57) ABSTRACT

The present exemplary embodiment discloses a method and system for utilizing machine learning and artificial intelligence to selecting an optimal conversion driver to convert a document into a printable form. The methods include receiving at least one user print request and at least one user submitted file associated with the user request, optimizing the conversion of a file by executing, by at least one computer processor, determining that format conversion is necessary for the file, identifying least one of a plurality of file conversion drivers as optimal for converting the file, causing the optimal file conversion driver to convert the file into a printer readable format, and printing the converted file. The conversion drivers may be selected from remote or local conversion engines. The machine learning employs artificial intelligence to select the optimal conversion path by analyzing the properties of the document submitted for conversion.

18 Claims, 13 Drawing Sheets

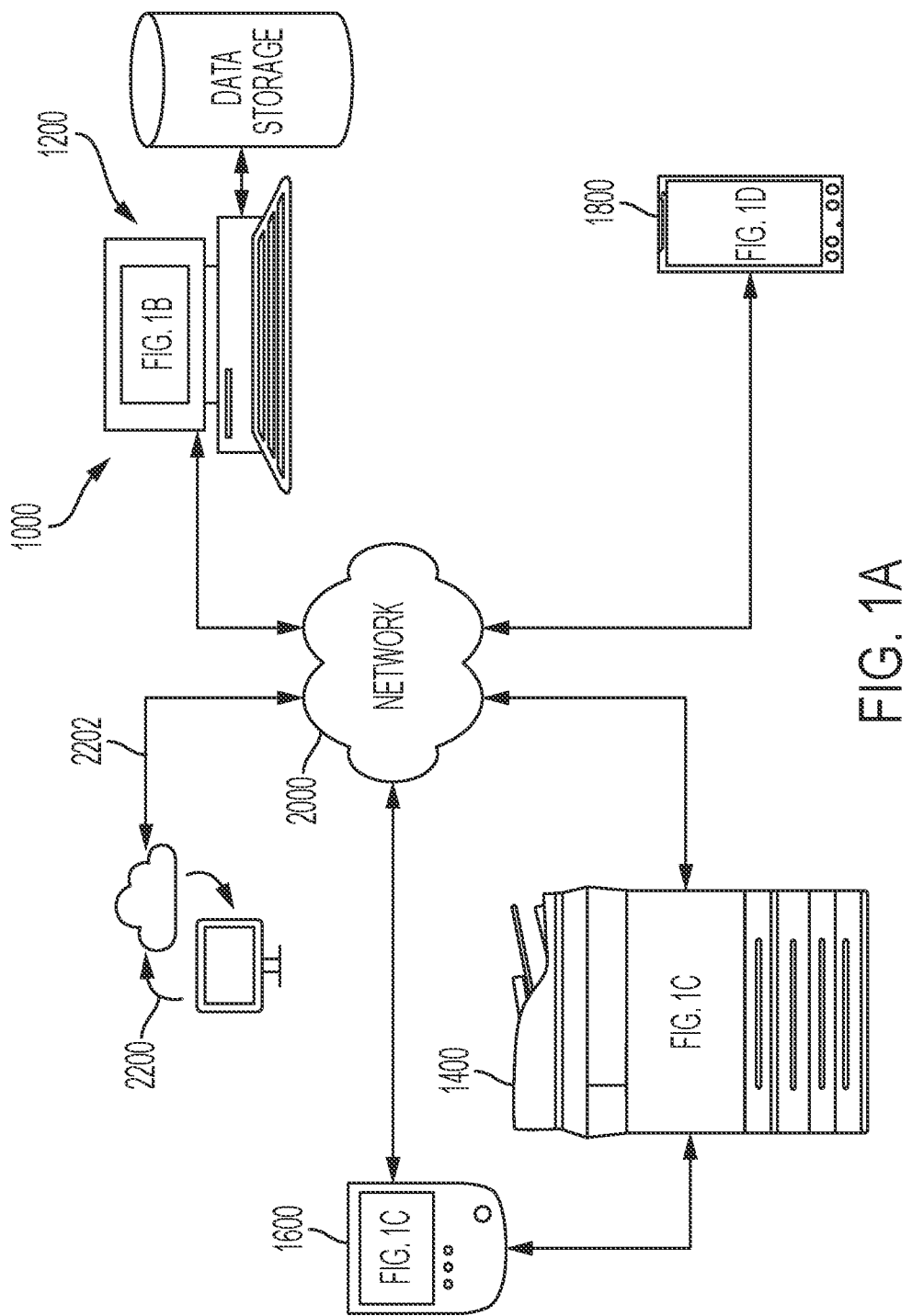

METHOD AND SYSTEM FOR INTELLIGENT OPTIMIZATION OF DOCUMENT CONVERSION ENGINE SELECTION

BACKGROUND

The subject application relates to a method and system for optimized printing that utilizes machine learning for selecting one of a plurality of conversion engines to convert a document into a printable form. However, it is to be appreciated that the present exemplary embodiment is also amenable to other like applications.

Consumers of printers and printing services expect a high level of convenience and reliability when submitting a document for printing. Generally, a user of a printer expects that the vast majority of their print requests will be processed without error. Printing failures cause decreased efficiency, increased costs, and frustrations in various environments that utilize printing as a part of everyday operations. Many failures are known to happen at the data conversion stage.

Typically, when a user submits documents for printing from print kiosks, mobile devices, computers, etc., the documents need to be converted into a printable format that is recognized by the print engine. In particular, the document can be converted by print conversion drivers such as those on devices with user interfaces (UI) (e.g. laptops, mobile devices, etc. . . . ) or on a printing device. Alternatively, the documents could be converted by remote print conversion drivers such as those on a cloud-based network or in other locations. Conversion of the requested document into a printable format that is recognized by the print engine is necessary for the successful completion of a printing job.

There are shortcomings with current techniques for submitting documents for printing or rendering on a print engine. In particular, a user must specify either a local or a remote conversion of the document based on preference, output quality, speed, cost, efficacy, and/or other factors. However, the user may not comprehend how the printed document will be rendered based on the combination of these factors. This makes it difficult for the user to properly select the optimal conversion driver for their printing needs. Therefore, the user may need to re-submit a print job if the printed document is undesirable. Such re-submissions may needlessly waste time, quality, cost, and/or other resources specifying a high-quality conversion when a lower-quality conversion would be sufficient.

Therefore, it may be desirable to have methods and systems for efficiently converting a document for printing. More particularly, it may be desirable to have a machine learning method and system for selecting an appropriate conversion driver without the need for user input.

BRIEF DESCRIPTION

This Brief Description is provided to introduce concepts related to the present specification. It is not intended to identify essential features of the claimed subject matter nor is it intended for use in determining or limiting the scope of the claimed subject matter. The exemplary embodiments described below are not intended to be exhaustive or to limit the claims to the precise forms disclosed in the following Detailed Description. Rather, the embodiments are chosen and described so that others skilled in the art may appreciate and understand the principles and practices of the subject matter presented herein.

The present embodiments are directed to a system for converting a document into printable electronic format that utilizes a machine learning component to employ an algorithm to determine the optimal conversion engine. This enables the system to quickly and autonomously pick the optimal document conversion path when a user is requesting a print job.

In one embodiment of this disclosure, described is a method for optimizing file conversion into a printable electronic format. The method includes receiving, by the print conversion system, at least one user print request and at least one user submitted file associated with the user request. The method further includes optimizing a file conversion path by executing, by at least one computer processor, the following instructions: i) automatically determining that format conversion is necessary for the file and ii) automatically identifying least one of a plurality of file conversion engines as optimal for converting the file. The method also includes causing the optimal file conversion driver to convert the file into a printer readable format. Additionally, the method includes transmitting the converted file to a print engine for printing, wherein the print engine is in communication with at least one hardware processor configured to execute the instructions to print the file, and wherein at least one of the receiving, optimizing, determining, identifying, causing, and transmitting is performed by a hardware processor.

In another embodiment of this disclosure, described is a system for optimizing file conversion into a printable electronic format. The system includes a print conversion optimization system that provides a processor in communication with memory, a data storage in communication with the processor. The memory stores instructions which are executed by the processor to a) receive at least one user print request and at least one user submitted file associated with the user request; b) optimize the user's file conversion path; c) cause at least one processor to execute instructions to the optimal file conversion driver to convert the file execute the conversion program to perform a data conversion on the document to return file in a printer readable format; and d) transmit the converted file to a printing device, wherein the print device has a print engine for printing. Additionally, the system optimizes the file conversion path by executing the following instructions: i) automatically determining that format conversion is necessary for the file and ii) automatically identifying least one of a plurality of file conversion drivers as optimal for converting the file.

BRIEF DESCRIPTION OF THE DRAWINGS

FIG. 1A is a schematic illustration of an exemplary print file conversion system according to one aspect of the present disclosure.

FIGS. 1C to 1C-2 is a schematic illustration of an exemplary printing device and user interface according to one aspect of the present disclosure.

DETAILED DESCRIPTION

Figure 1B:
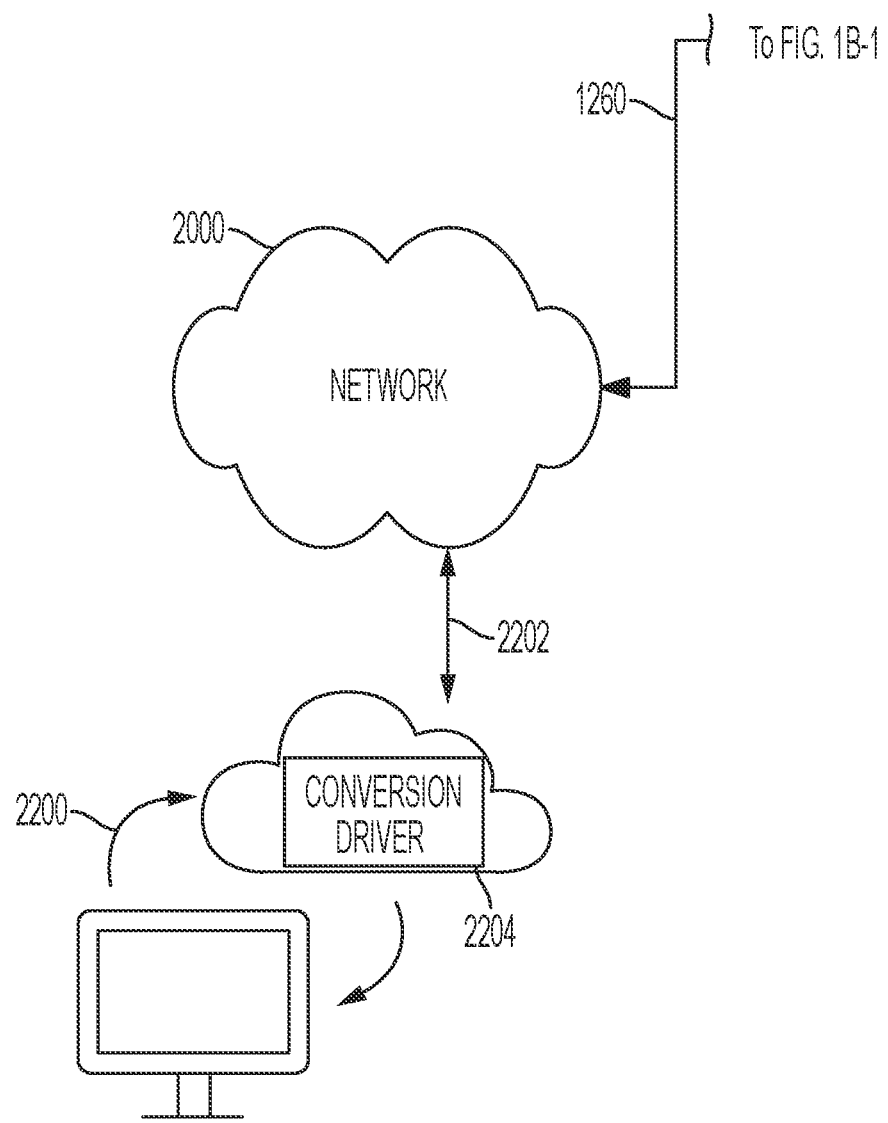
FIGS. 1B to 1B-2 is a schematic illustration of an exemplary computing device according to one aspect of the present disclosure.

Reference will now be made in detail to the present embodiments (exemplary embodiments) of the invention, examples of which are illustrated in the accompanying drawings. Wherever possible, the same reference numbers will be used throughout the drawings to refer to the same or like parts. In the following description, reference is made to the accompanying drawings that from a part thereof, and in which is shown by way of invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

While the invention has been illustrated with respect to one or more implementations, alterations, and/or modifications can be made to the illustrated examples without departing from the spirit and scope of the appended claims. In addition, while a particular feature of the invention may have been disclosed with respect to only one of several implementations, such feature may be combined with one or more other features of the other implementations as may be desired and advantageous for any given or particular function. Also, the singular forms "a," "an," and "the" include plural references unless the context clearly dictates otherwise. Furthermore, to the extent that the terms "including", "includes", "having", "has", "with", or variants thereof are used in either the detailed description and the claims, such terms are intended to be inclusive in a manner similar to the term "comprising." The term "at least one of" is used to mean one or more of the listed items can be selected.

Note that this disclosure uses the term "file" interchangeably with "document," wherein a file can be a raster file (e.g. .png, .gif, .jpg, etc.), a word processor file (e.g. MS Word .doc, .docx, .rtf, .odt, .txt, etc.), or the like. The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or the like, and is also intended to encompass so-called "firmware" that is software stored on a ROM or the like. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

As used herein, a "cloud" or "cloud-based network" can comprise a collection of hardware, software, services, and/or resources that can be invoked to instantiate a virtual machine, process, or other resource for a limited or defined duration. In embodiments, the cloud-based network be a public cloud or a private cloud. More particularly, the cloud-based network can be a public loud or a private cloud. More particularly, the cloud-based network can be inside or outside a firewall associated with a local area network and/or other networks. Further as used herein, a "user interface" (UI) can refer to any type of human readable device or resource configured for integration into a printing device. It should be apparent that a "user interface" may also refer to any computing device configured for mobile, or remote usage or operation such as, for example a tablet computer, a cellular phone, a smart phone, notebook computer, personal digital assistant, desktop computer, laptop, and/or other similar devices.

Still further, as used herein, a "print engine" can refer to any type of hardware or combination of hardware and software that can be configured to print or render a document onto a substrate. For example, a print engine can receive an electronic document in a printable format and render the document onto a paper substrate. Further still, as used herein, a "converter", "conversion driver", and/or "conversion engine" can be used interchangeably and can refer to any type of hardware, software, or combination thereof that can be configured to convert an electronic file or document in a first format into another electronic file or document in a second format. Wherein each conversion engine is configured to support specific formats and fonts. In addition, each configuration requires specific processing power and memory to execute and store the conversion engine instructions.

FIGS. 1A to 1D-2 are exemplary block diagrams of print-processing or computational environments in which embodiments may be implemented. It should be appreciated that FIGS. 1A to 1D-2 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 1A, some embodiments may be implemented in the context of a print file conversion system 1000 that can include one or more processors such as a print conversion optimization system 1200, a communications network 2000, a printing device 1400 such as a printing kiosk or multifunctional printer and in some embodiments a user interface 1600 for the printing device, and a user device 1800, which are linked together by communication links (arrows), which may be connected directly or through network communication interfaces for communicating with external devices. These components are described in greater detail below (FIGS. 1B to 1D-2). While the print conversion optimization system 1200 and printing device 1400 are illustrated by way of example, the system 1000 may be hosted by fewer or more linked devices. Additionally, a user may submit a file to print on at least one of the print conversion optimization system 1200, communications network 2000, a cloud computing system 2200, printing device 1400, user interface 1600, or a user device 1800. Before the file can be printed by the printing device 1400 the file must be converted into a printable format. For example, the document may be a Microsoft® Office® document, such as Word®, Powerpoint®, or Excel®, that may need to be converted into a printable format such as PCL, PS, PDF, JPEG, XPS, and/or others, to be properly interpreted by the print engine (see FIGS. 1C to 1C2). It should be appreciated that other formats of the document, other printable formats, as well as any conversion techniques between any of the formats are envisioned.

It should be readily apparent to one of ordinary skill in the art that the exemplary system 1000 depicted in FIG. 1A represents a generalized schematic illustration and that other components and/or entities may be added or existing components and/or entities may be removed or modified. The method of using machine learning artificial intelligence to optimize file conversion for printing can be applied in different print-processing or computational environments.

Figures 1, 1B:
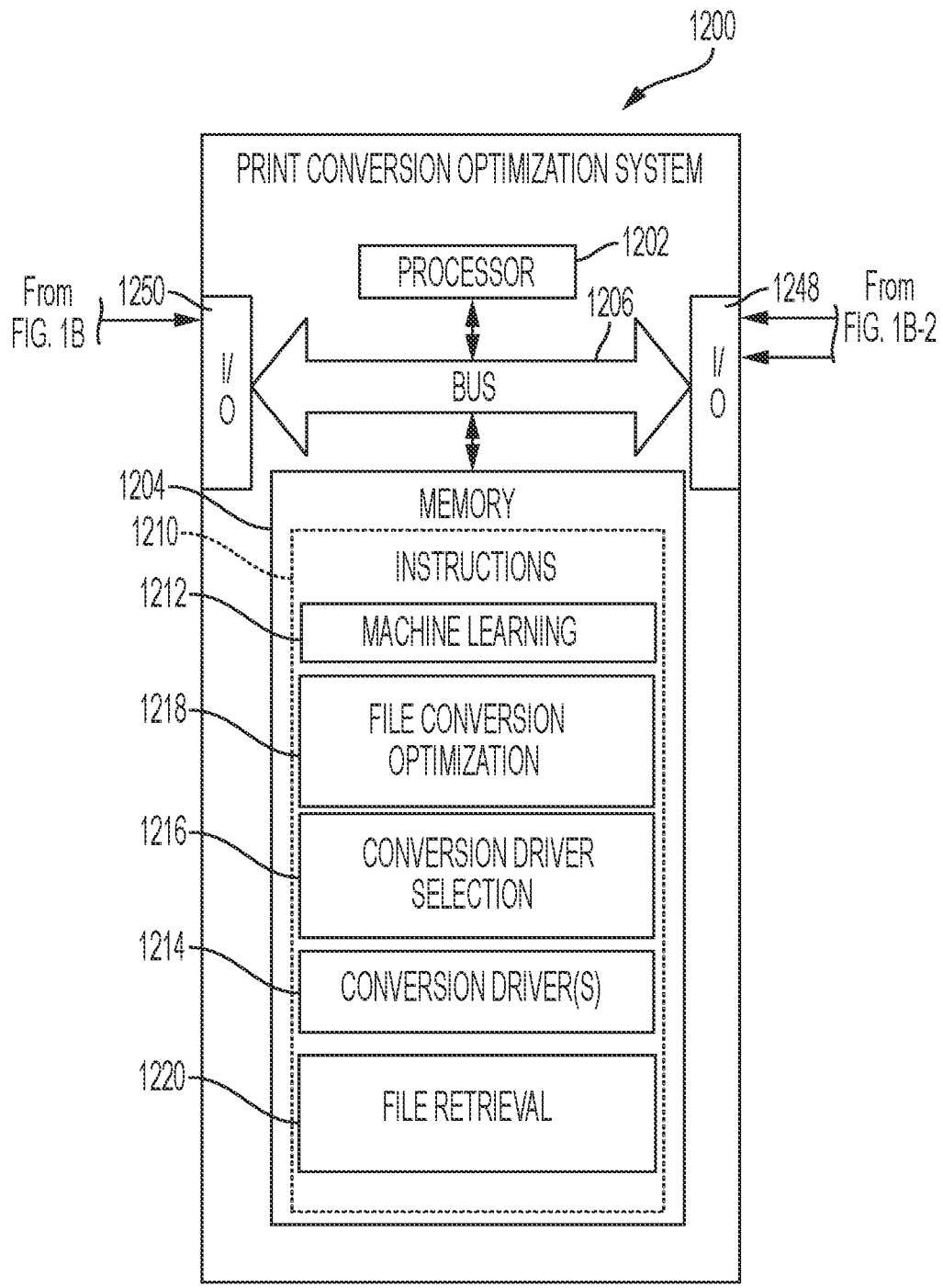
FIGS. 1D to 1D-1 is a schematic illustration of an exemplary user device according to one aspect of the present disclosure.
Figures 1, 1B, 2:
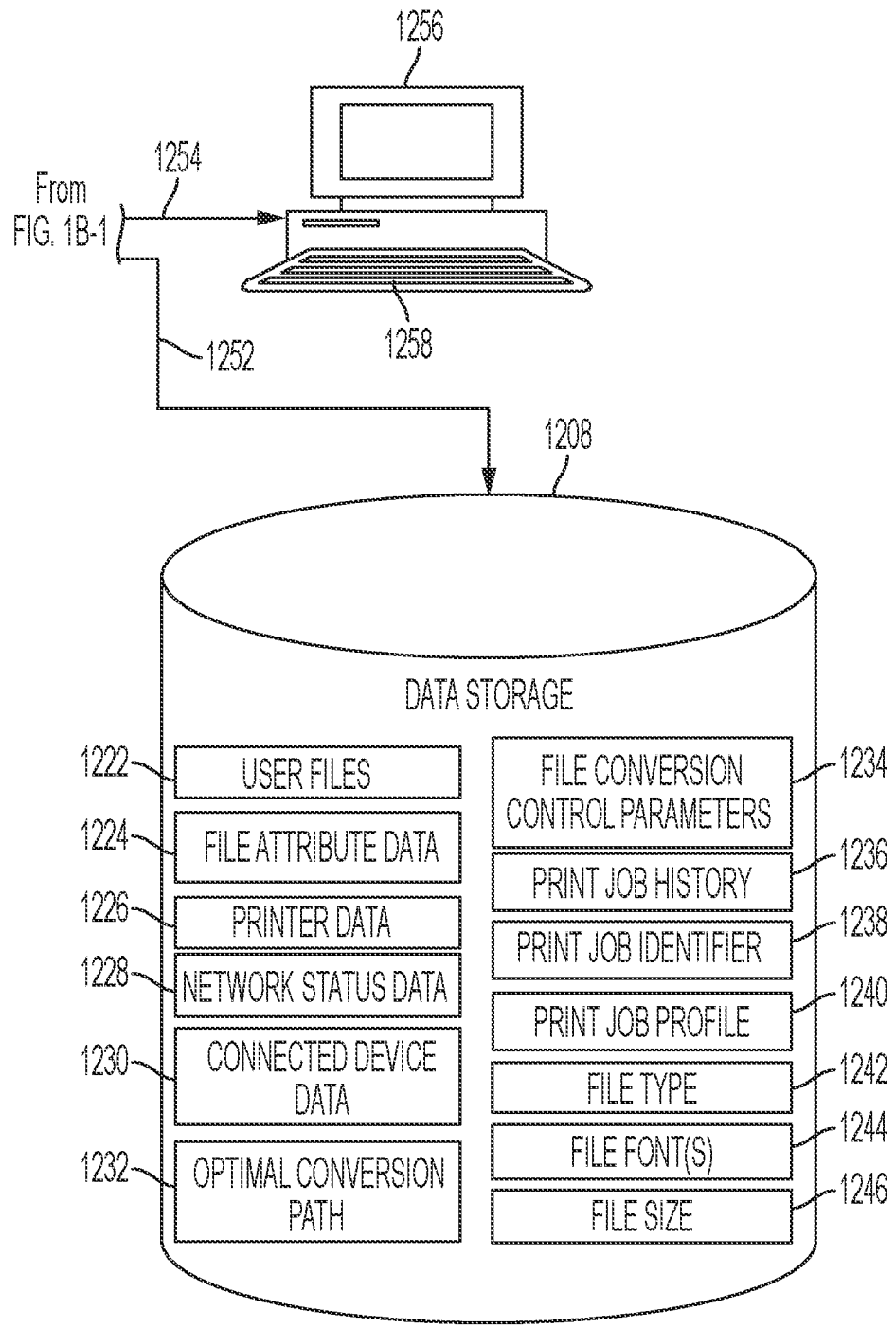

Turning to FIGS. 1B, 1B-1, and 1B-2, the operation of the print conversion optimization system 1200 disclosed herein is performed by the processor 1202, according to the instructions stored in memory 1204 connected to the processor

1202. The processor 1202 is a hardware device for executing software instructions. The processor 1202 can be a custom made or commercially available processor, a central processing unit (CPU), an auxiliary processor among several processors associated with the server computer, a semiconductor-based microprocessor (in the form of a microchip or chip set), or generally any device for executing software instructions.

The various components of the print conversion optimization system 1200 may all be connected by a system bus 1206. The system bus, hereinafter referred to as a bus, may include a data bus, a control bus, and/or an address bus. The processor 1202 of the print conversion optimization system is in communication with an associated data storage 1208 via a link 1252. The data storage 1208 is capable of implementation on components of the print conversion optimization system 1200, e.g., stored in local memory 1204, i.e., on hard drives, virtual drives, or the like, or on remote memory accessible to the print conversion optimization system 1200.

The associated data storage 1208 corresponds to any organized collections of data (e.g., user files, printer data, network status data, connected devices data, and print job history, etc.) used for one or more purposes. Implementation of the associated data storage 1208 is capable of occurring on any mass storage device(s), for example, magnetic storage drives, a hard disk drive, optical storage devices, flash memory devices, or a suitable combination thereof. The associated data storage 1208 may be implemented as a component of the computer system 1200, e.g., resident in memory 1204, or the like.

In one embodiment, the associated data storage 1208 may include data corresponding to user submitted files 1222, file attribute data 1224 (alternatively referred to as descriptive data), printer data 1226, network status data 1228, connected devices data 1230, optimal file conversion path 1232, file conversion control parameters 1234, print job history 1236, print job identifier 1238, and job profile 1240. It should be understood that the user submitted files 1222, file attribute data 1224, printer data 1226, network status data 1228, connected devices data 1230, optimal file conversion path 1232, file conversion control parameters 1236, print job history 1238, print job identifier 1240, and job profile 1240 may have identical copies stored on the various devices of the print file conversion system 1000. Alternatively, the user submitted files 1222, file attribute data 1224, printer data 1226, network status data 1228, connected devices data 1230, optimal file conversion path 1234, file conversion control parameters 1234, print job history 1236, print job identifier 1238, and job profile 1240, stored on the various devices of the print file conversion system 1000 may be different than the versions stored on the print conversion optimization system 1200.

The memory 1204 also stores instructions 1210 for data processing, a machine learning model 1212 (also referred to as machine learning artificial intelligence), conversion driver (or drivers) 1214, conversion driver selection component 1216, and file conversion optimization component 1218. The conversion driver(s) 1214 stored on the print conversion optimization system 1200 may have identical copies stored on the various devices of the print file conversion system 1000. Alternatively, the conversion driver(s) 1214 stored on the various devices of the print file conversion system 1000 may be different than the versions stored on the print conversion optimization system 1200.

Figure 1C:
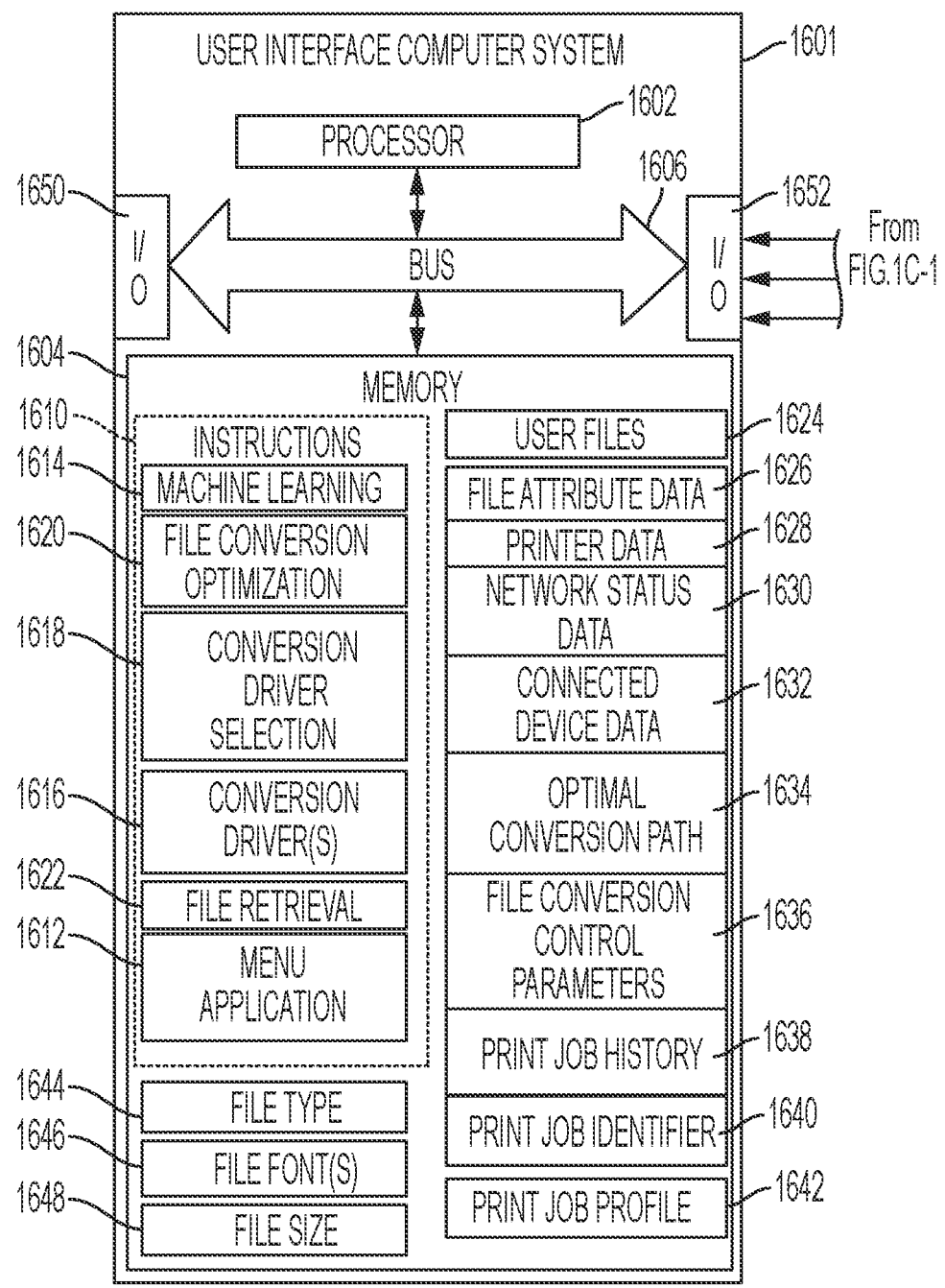
Figures 1, 1C:
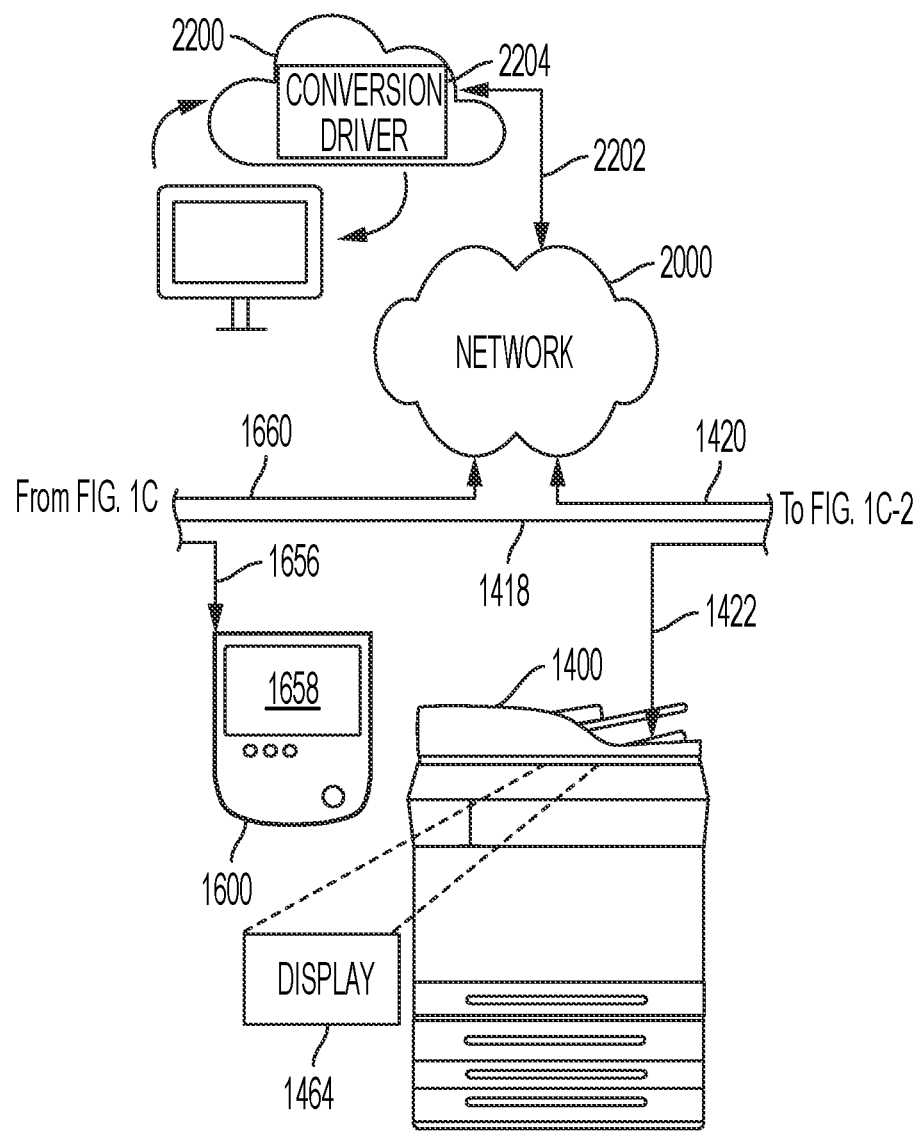
Figures 1, 1C, 2:
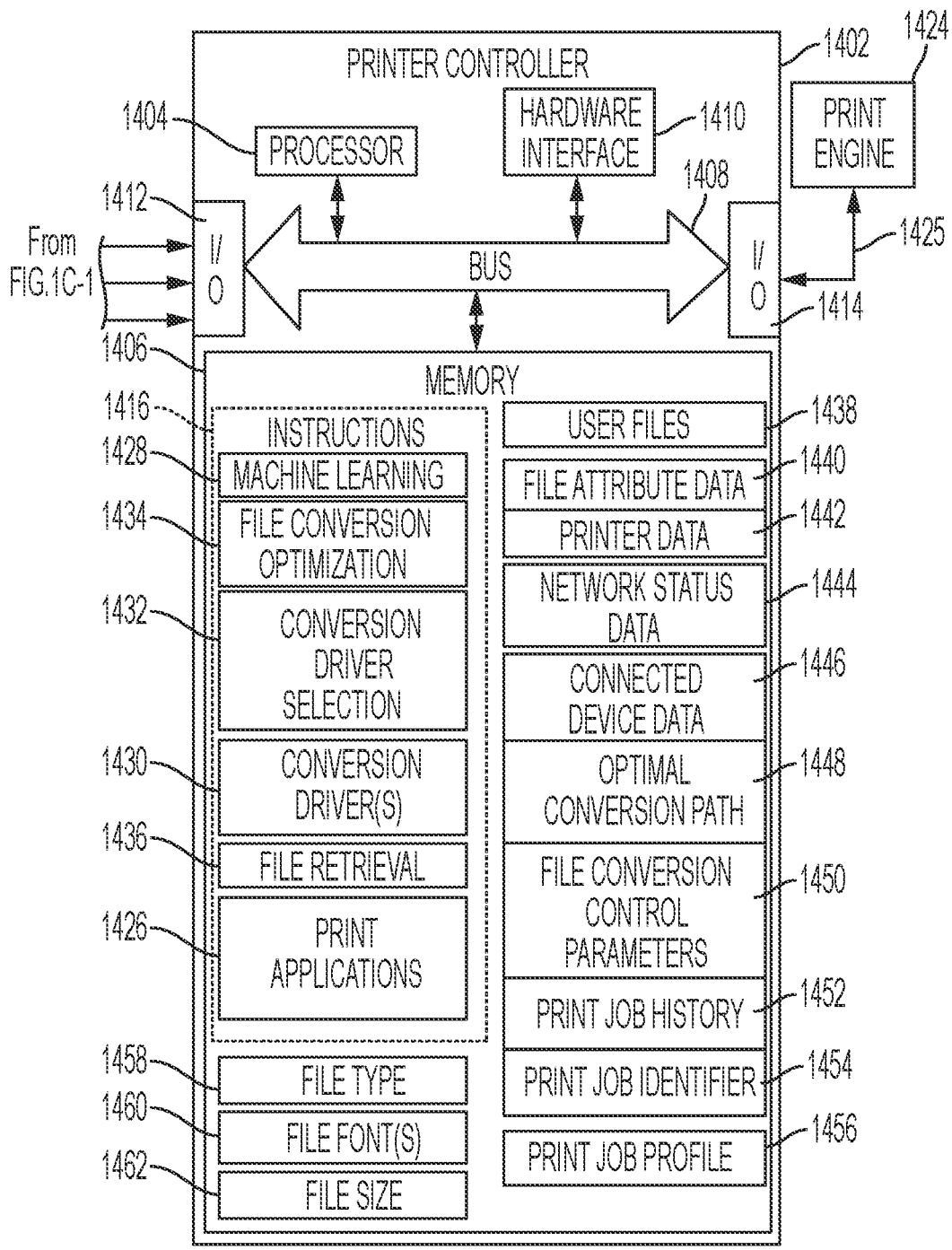

In particular embodiments, the file conversion optimization component 1218 may cause the processor to execute instructions to the retrieve 1220 a user submitted file 1222, determine if conversion is necessary for printing, convert the file into a printer readable format and transmit the file to one or more printing devices 1400. The printing device 1400 may be a standalone single function device such as a dedicated printer or a multifunctional device such as combined printer, scanner, copy machine, etc. Preferably, printing device 1400 can be a kiosk and function as a multifunctional device capable performing printing, copying, scanning, faxing, etc. Before the document is printed, the document must be converted by a print conversion driver 1214 into a printable format. For example, the file may be a Microsoft® Office® document, such as Word®, Powerpoint®, or Excel®, that may need to be converted into a printable format such as PCL, PS, PDF, XPS, and/or others, to be properly interpreted by the print engine 1424 of the print device 1400 (FIGS. 1C, 1C-1, and 1C-2). It should be appreciated that other formats of the file, other printable formats, as well as any conversion techniques between any of the formats are envisioned.

In other embodiments, the processor 1202 executes instructions to determine file attribute data/descriptive data 1224 which may include file type 1242 (also referred to as format) data, font data 1244, and file size data 1246. The file conversion optimization component 1218 causes the processor 1202 to process the file attributes 1224 and automatically determine that file format conversion is necessary for the file 1222 and automatically identifies at least one of a plurality of file conversion drivers 1214 as optimal for converting the file. Additionally, the determination of the optimal conversion path 1232 causes the processor 1202 to execute the conversion driver selection component 1216. In some embodiments the file 1222 is converted and sent to the print engine 1424 of a printing device 1400 (FIGS. 1C, 1C-1, and 1C-2) to be printed.

According to various embodiments contemplated herein, the selection of the optimal file conversion path 1232 may be performed by a machine learning model 1212. The machine learning model 1212 may perform the conversion by selecting from one or a combination of more than one conversion drivers 1214, 1430 (FIG. 1C-2), 1616 (FIG. 1C), 1816 (FIG. 1D), 2204, which may also be referred to as conversion engines interchangeably. The conversion drivers 1214 (and/or 1430, 1616, 1816, 2204) may be a local conversion driver, a remote conversion driver, or a combination of both. For example, the conversion driver 1214 may be located on the user interface 1600 (FIG. 1C-1), on the printing device 1400 (FIG. 1C-1), on a user device 1800 (FIG. 1D-1), and/or at least one cloud-based conversion driver 2204 located on a cloud computing system 2200, or a combination of the four. FIG. 1A depicts a configuration where the printing device 1400 is connected to the network and the network is in communication with various cloud-based conversion drivers 2204.

In another embodiment, determining that format conversion is necessary further comprises employing machine learning artificial intelligence to automatically identify least one of a plurality of file conversion drivers 1214 (and/or 1430, 1616, 1816, 2204), as optimal for converting the file 1222, wherein the optimal file conversion driver 1232 (and/or 1430, 1616, 1816, 2204) is selected to convert the file 1222. In some embodiments, the machine learning artificial intelligence model 1212 is configured to provide a real-time classification of at least one user submitted file 1222 and the available document conversion drivers 1214 (and/or 1430, 1616, 1816, 2204). In addition, the machine learning model 1212 predicts an optimal file conversion path 1232 and designates the file conversion driver 1214 (and/or 1430, 1616, 1816, 2204), wherein the file conversion driver 1214 (and/or 1430, 1616, 1816, 2204) will convert at least one user submitted file 1222 into a printable electronic format.

In particular embodiments, a machine learning artificial intelligence model 1212 is configured to predict an optimal set of one or more file conversion control parameters 1234 for the process of converting a file 1222. The predicted optimal set of one or more control parameters 1234 are derived using a trained machine learning artificial intelligence model 1212. This trained machine learning artificial intelligence model 1212 is configured to provide a real-time classification of the optimal file conversion path 1232. Further, the real-time classification of the optimal file conversion path 1232 is determined from the machine learning model 1212 detecting file attributes 1224 and available file conversion drivers 1214 (and/or 1430, 1616, 1816, 2204). Then machine learning model 1212 causes the processor 1202 to execute a file conversion optimization component 1218 to determine which of the devices connected to the print conversion system has an optimal conversion driver. The machine learning model 1212 also causes the processor 1202 to perform the file conversion with the conversion driver 1214, using the optimal file conversion driver path 1232 and conversion control parameters 1234. Here, the machine learning artificial intelligence model 1212 adjusts the one or more file conversion control parameters 1234 in real-time. Additionally, the machine learning artificial intelligence model 1212 provides real-time feedback, to the user about file conversion availability.

The print conversion optimization system 1200 may include one or more input/output (I/O) interface devices 1248, and 1250 for communicating with external devices. The I/O may communicate, through communications link 1254, with one or more of a display device 1256, for displaying information, and a user input device 1258 which may be a keyboard (e.g., a physical keyboard or a touch screen graphically displayed keyboard) for inputting text, and/or a pointing device (e.g., such as a mouse, track ball, pen device, which may be utilized in association or with the keyboard, etc.) for communicating user input information and command selections to the processor 1202.

In addition, the print conversion optimization system 1200 may communicate with one or more components of the print file conversion system 1000 via a first communication network 2000. A user device 1800 may also communicate with the print device 1400 indirectly via a cloud computing system connected to the communications network via communications links 2202. The communication network 2000 may include connections such as, for example, wired connections, wireless communication links, or fiber optic cables, and may provide any suitable medium of communications such as WiFi, Bluetooth, Ethernet, cellular, intranet, and Internet. The user may submit the print request and document or file 1222 using a computing device that may be at least one of a print device 1400, a user interface 1600, and/or a user device 1800 that may be a tablet computer, a cellular phone, a smart phone, notebook computer, personal digital assistant, desktop computer, laptop, and other similar devices.

In some embodiments, the print conversion optimization system 1200 may constantly or periodically monitor the parameters (such as, but not limited to, device type, device memory capacity, network connection strength, printer que size, printer toner availability, printer paper availability, printer status, printer error messages, and the like) of the devices communicatively connected to the print file conversion system 1000. The print conversion optimization system 1200 may monitor file conversion control parameters 1234 for the print file conversion system 1000 such as available print conversion drivers 1214 (and/or 1430, 1616, 1816, 2204), print conversion efficiency, user submitted files 1222, file attribute data 1224, printer data 1226, network status data 1228, connected devices data 1230 such as printer availability, print job history 1236, print job identifier 1238, and job profile 1240, and other aspects that may indicate that a change in optimization parameters is or will be required. If a parameter change or adjustment is required, the print conversion optimization system 1200 may automatically adjust the any of the indicated file conversion control parameters 1234 for optimization.

In a particular embodiment, the print conversion optimization system 1200 may execute instructions to create a unique print job identifier 1238 based on file attribute data 1224 and available conversion drivers 1214 (and/or 1430, 1616, 1816, 2204). Further, the machine learning model 1212 is configured to automatically detect and classify file attribute data 1224 that defines the properties of the file, automatically associate the file attribute data 1224 with the unique print job identifier 1238. Here, the descriptive data 1224 and associated print job identifier 1238 are stored as a job profile 1240; automatically classifying available conversion drivers 1214 (and/or 1430, 1616, 1816, 2204) and identifying an optimal file conversion path 1232, wherein classifying parameters for the file attribute data 1224 and the available file conversion drivers 1214 (and/or 1430, 1616, 1816, 2204) indicates the location of the file conversion driver 1214; and automatically converting the file 1222 using the optimal file conversion path 1232. File attribute data 1224 may be file format or type 1242, file size 1246, file fonts 1244, or a combination of the three. Additionally, the machine learning artificial intelligence model 1212 may be configured to monitor a history 1236 of previous jobs stored as profiles 1240, wherein the history is used to forecast an optimal conversion path 1232.

It should be understood by a person skilled in the art that the print conversion optimization system 1200 may be hosted by fewer or more linked computing devices. Each computing device may include, for example, a server computer, desktop, laptop, tablet computer, smartphone, or any other computing device capable of implementing the method described herein. In another embodiment print conversion optimization system may be part of a print server. In yet another embodiment, the print conversion optimization system 1200 may be part of a distributed computing environment such as a cloud computing system 2200. The cloud computing system may be a server computer running software and connected to the network 2000. For example, the cloud server may be implemented on or as a web site, a server on a private network or local intranet, or other local or remote hardware, software, or logic. Alternatively, the print conversion optimization system 1200 can be incorporated in a printing device 1400 or an associated user interface 1600.

Referring to FIGS. 1C, 1C-1, and 1C-2, the printing device 1400 may be a standalone single function device such as a dedicated printer. Alternatively, the printing device 1400 may be a multifunctional device that contains a printer, scanner, and copy machine, etc. In some embodiments, the printing device 1400 can be a kiosk and functions as a multifunctional device capable of functions such as printing, copying, scanning, faxing, etc. The printing device 1400 disclosed herein may include a controller 1402 operatively connected to a hardware interface 1410. The controller 1402 may have a processor 1404 and instructions stored in memory 1406 connected to the processor 1404. The processor 1404 is a hardware device for executing software instructions. The processor 1404 can be a custom made or commercially available processor, a central processing unit (CPU), a semiconductor-based microprocessor (in the form of a microchip or chip set, or generally any device for executing software instructions. The various components of the print controller 1402 may all be connected by a system bus 1408. The processor 1404 of the print device is in communication with the memory 1406 via the data bus 1408.

The print device 1400 may include one or more input/output (I/O) interface devices 1412 and 1414 for communicating with external devices. The I/O interface 1412 may communicate, via communications link 1418, with a user interface 1600 and/or an input device, such as a set of buttons, a keyboard or touch or writable screen, for inputting text, and/or a cursor control device, such as mouse, trackball, or the like, for communicating user input information and command selections to the print engine 1404. Also, the processor 1404 of the print controller 1402 may be in communication, via communications link 1425, with the print engine 1424 to render printer readable data on physical media. The printer engine may be any combination of mechanical and components arranged to perform the rendering on physical media (i.e., the part of the printer that does the printing). Additionally, the print device 1400 may communicate with one or more components of the print file conversion system 1000 via communications link 1420 connected to a communications network 2000. A user device 1800 or another computing device such as the print conversion optimization system 1200 or a cloud computing system 2200 may communicate with the print device 1400 indirectly via a communications network 2000, via communications link 1420. The communications link 1420 may include connections such as, for example, wired connections, wireless communication links, or fiber optic cables, and may provide any suitable medium of communications such as Wi-Fi, Bluetooth, Ethernet, cellular, intranet, and Internet. The link 1420 may, in turn, communicate with a network such as public or private networks as well as the Internet and/or GSM, CDMA networks. In some embodiments the print conversion optimization system 1200 transmits a converted file, via the communications link 1420, to the print engine 1424 of a printing device 1400 for printing, wherein the print engine 1424 is in communication with at least one hardware interface 1410 and at least one hardware processor 1404 configured to execute the instructions 1416 to print a user file 1438.

The processor 1404 may also be configured to communicate with applications 1426 on the print device 1400 as well as other devices, via a communications interface 1412. Those devices may include a user interface 1600, user device 1800, a print conversion optimization system 1200, and/or a cloud server. It should be appreciated that the communication and interaction between the printer processor 1402 and such applications on other devices can be bidirectional. Additionally, the print device 1400 may contain one or many software and web applications 1426 to deliver additional functionality or user accessibility.

In a particular embodiment, the print conversion optimization system 1200 may be implemented on the printing device 1400. In particular, the processor executes instructions 1416 stored in memory 1406 such as a machine learning model 1428, conversion drivers 1430, a conversion driver selection component 1432, file conversion optimization component 1434, and a file retrieval component 1436. Additionally, memory 1406 may store data such as user files 1438, file attribute data 1440, printer data 1442, network status data 1444, connected device data 1446, optimal conversion path 1448, file conversion control parameters 1450, print job history 1452, print job identifier 1454, job profile 1456, file type/format 1458, fonts 1460, and size 1462. In general, the file conversion optimization component 1434, stored in memory 1406 and executed by the processor 1404, acquires the file type 1458, fonts 1460, and size 1462 from the file 1438 and sends the data to the file conversion optimization component 1434. The machine learning artificial intelligence component 1428 employs machine learning and analytics determine the optimal print conversion path 1448.

In another embodiment, the file conversion optimization component 1434 may cause the processor to execute the file retrieval component 1436 a user submitted file 1438, determine if conversion is necessary for printing, convert the file into a printer readable format and transmit the file to the print engine 1424 of the printing device 1400. Before the document is printed, the document must be converted by a print conversion driver 1430 into a printable format. For example, the file may be a Microsoft® Office® document, such as Word®, Powerpoint®, or Excel®, that may need to be converted into a printable format such as PCL, PS, PDF, XPS, and/or others, to be properly interpreted by the print engine 1424 of the print device 1400. It should be appreciated that other formats of the file, other printable formats, as well as any conversion techniques between any of the formats are envisioned.

In particular embodiments, the processor 1404 executes instructions 1416 to determine file attribute data 1440 which may include file type 1458 (also referred to as format) data, font data 1460, and file size data 1462. The file conversion optimization component 1434 causes the processor 1404 to process the file attributes 1440 and automatically determine that file format conversion is necessary for the file and automatically identifies least one of a plurality of file conversion drivers 1214, 1430, 1616, 1816, or 2204 as optimal for converting the file. Additionally, the determination of the optimal conversion path 1448 causes the processor to execute the conversion driver selection component 1432. In some embodiments the file is converted and sent to the print engine 1424 to be printed.

According to various embodiments contemplated herein, the selection of the optimal file conversion path 1448 may be performed by a machine learning model 1428. The machine learning model 1428 may perform the conversion by selecting from one or a combination of more than one conversion drivers 1214, 1430, 1616, 1816, or 2204, which may also be referred to as conversion engines interchangeably. The conversion drivers 1214, 1430, 1616, 1816, or 2204, may be a local conversion driver, a remote conversion driver, or a combination of both. For example, the conversion driver may be located on the user interface 1600, on the printing device 1400, on a user device 1800, and/or at least one cloud-based conversion driver 2204 located on a cloud computing system 2200, or a combination of the four. FIGS. 1C, 1C-1, and 1C-2 depict a configuration where the printing device 1400 is connected to the network and the network is in communication with various cloud-based conversion drivers 2204.

In another embodiment, determining that format conversion is necessary further comprises employing a machine learning artificial intelligence component 1428 to automatically identify least one of a plurality of file conversion drivers 1214, 1430, 1616, 1816, or 2204 as optimal for converting the file 1438, wherein the optimal file conversion driver 1430 (and/or 1214, 1616, 1816, or 2204) is selected to convert the file 1438. In some embodiments, the machine learning artificial intelligence is configured to provide a real-time classification of at least one user submitted file 1438 and the available document conversion drivers 1430 (and/or 1214, 1616, 1816, 2204). In addition, the machine learning model 1428 predicts an optimal file conversion path 1448 and designates the file conversion driver 1430 (and/or 1214, 1616, 1816, 2204), wherein the selected file conversion driver 1430 (and/or 1214, 1616, 1816, 2204) will convert at least one user submitted file 1438 into a printable electronic format.

In particular embodiments, a machine learning artificial intelligence model 1428 is configured to predict an optimal set of one or more file conversion control parameters 1450 for the process of converting a file 1438. The predicted optimal set of one or more control parameters 1450 are derived using a trained machine learning artificial intelligence model 1428. This trained machine learning artificial intelligence model 1428 is configured to provide a real-time classification of the optimal file conversion path 1448. Further, the real-time classification of the optimal file conversion path 1448 is determined from the machine learning model 1428 detecting file attributes 1440 and available file conversion drivers 1430 (and/or 1214, 1616, 1816, 2204). Then the machine learning model 1428 causes the processor to execute file conversion optimization component 1434 to determine which of the devices connected to the print conversion system 1000 has a conversion driver 1430 (and/or 1214, 1616, 1816, 2204) that is optimal for converting the file 1438. The machine learning 1428 model also causes the processor 1404 to execute conversion driver 1430 instructions to perform the file conversion using the optimal file conversion driver path 1448 and conversion control parameters 1450. Here, the machine learning artificial intelligence model 1428 adjusts the one or more file conversion control parameters 1450 in real-time. Additionally, the machine learning artificial intelligence model 1428 provides real-time feedback, to the user about file conversion availability.

In some embodiments, the file conversion optimization component 1434 may be constantly or periodically monitoring the parameters (such as, but not limited to, device type, device memory capacity, network connection strength, printer que size, printer toner availability, printer paper availability, printer status, printer error messages, and the like) of the devices communicatively connected to the print file conversion system 1000. The file conversion optimization component 1434 may monitor file conversion control parameters 1450 for the print file conversion system 1000 such as available print conversion drivers 1430 (and/or 1214, 1616, 1816, 2204), print conversion efficiency, user submitted files 1438, file attribute data 1440, printer data 1442, network status data 1444, connected devices data 1446 such as printer availability, print job history 1452, print job identifier 1454, and job profile 1456, and other aspects that may indicate that a change in optimization parameters is or will be required. If a parameter change or adjustment is found to be required, the file conversion optimization component 1434 may automatically adjust any of the indicated file conversion control parameters 1450 for optimization.

In a particular embodiment, the file conversion optimization component 1434 may cause the processor 1404 to execute instructions to creating a unique print job identifier 1238 based on user submitted file's attributes 1440 and available conversion drivers 1430 (and/or 1214, 1616, 1816, 2204). Further, the machine learning model 1428 is configured to automatically detect and classify file attribute data 1440 that defines the properties of the file, automatically associate the file attribute data 1440 with the unique print job identifier 1454. Here, the descriptive data 1440 and associated print job identifier 1454 are stored as a job profile 1456; automatically classifying available conversion drivers 1430 (and/or 1214, 1616, 1816, 2204) and identifying an optimal file conversion driver, wherein classifying parameters for the descriptive data and the available file conversion drivers indicates the location of the file conversion driver; and automatically converting the file with the optimal file conversion driver. The descriptive data may be file format or type 1458, file size 1462, file fonts 1460, or a combination of the three. Additionally, the machine learning artificial intelligence model 1428 may be configured to monitor a history 1452 of previous jobs stored as profiles 1456, wherein the history 1452 is used to forecast an optimal conversion path 1448.

The printing device 1400, may have a user interface 1600 that is fixedly or removably mounted to an exterior of the printing device 1400. Additionally, or alternatively, the printing device 1400 may include a display device 1464, such as an LCD or LED screen, as will be appreciated by those skilled in the art.

The user interface 1600 may include a display device 1658 as well. A graphical user interface (GUI) may be displayed on the user interface 1600. The display device 1658 may be a touch screen with input capability. The user interface 1600 may have a computing 1601 system with a processor 1602 and instructions 1610 stored in memory 1604 connected to the processor 1602. The processor 1602 is a hardware device for executing software instructions. The processor 1602 can be a custom made or commercially available processor, a central processing unit (CPU), a semiconductor-based microprocessor (in the form of a microchip or chip set, or generally any device for executing software instructions. The various components of the user interface 1600 may all be connected by a data/control bus 1606. The processor 1602 of the print device is in communication with the memory 1604 via the data bus 1606.

The user interface 1600 may include one or more input/output (I/O) interface devices 1650 and 1652 for communicating with external devices. The I/O interface 1650 may communicate, via communications link 1418, with a print device 1400. The I/O interface 1652 may also communicate, via communications link 1656, with an input device 1658, such as a set of buttons, a keyboard or touch or writable screen, for inputting text, and/or a cursor control device, such as mouse, trackball, or the like, for communicating user input information and command selections to the processor 1602. Additionally, the user interface 1600 may communicate with one or more components of the print file conversion system 1000 via communications link 1660 connected to a communications network 2000.

A user may use the user interface 1600 to receive, transmit, or access one or more files 1624 stored on or otherwise available via the user interface 1600. For example, the user may download or open a word-processor document on the user interface 1600. In a further example, the user could create a new document using the user interface 1600. In one embodiment, the user may submit files 1624 such as a document or documents for printing via any type of submission platform or technique. For example, the user may submit the file 1624 to the printing device 1400 via an email attachment, universal serial bus (USB) print, direct web submission, Wi-Fi Ad Hoc or Wi-Fi Direct, and/or others.

In a particular embodiment, the user interface may include a processor 1602 executing instructions for a menu application 1612 that provides a main menu with several choices for user. For instance, the menu application 1612 may provide the customer with the option of selecting "printing with optimal file conversion" that allows the customer to print using the optimal file conversion system 1200.

In another embodiment, the optimal file conversion system 1200 may be implemented on the user interface 1600. In particular, the processor 1602 executes instructions 1610 stored in memory 1604 such as a machine learning artificial intelligence component 1614, conversion drivers 1616, conversion driver selection component 1618, file conversion optimization component 1620, and a file retrieval component 1622. Additionally, memory 1604 may store data such as user files 1624, file attribute data 1626, printer data 1628, network status data 1630, connected device data 1632, optimal conversion path 1634, file conversion control parameters 1636, print job history 1638, print job identifier 1640, job profile 1642, file type/format 1644, fonts 1646, and size 1648. In general, file conversion optimization component 1620, stored in memory 1604 and executed by the processor 1602, acquire the file type 1644, fonts 1646, and size 1648 and applies the data to the optimal file conversion component 1620. In another embodiment, a machine learning artificial intelligence component 1614 employs machine learning and analytics determine the optimal print conversion path 1634.

In particular embodiments, the file conversion optimization component 1620 may cause the processor 1602 to execute instructions to the retrieve 1622 a user submitted file 1624, determine if conversion is necessary for printing, convert the file 1624 into a printer readable format and transmit the file 1624 to one or more printing devices 1400. The printing device 1400 may be a standalone single function device such as a dedicated printer or a multifunctional device such as combined printer, scanner, copy machine, etc. Preferably, printing device 1400 can be a kiosk and functions as a multifunctional device capable of functions such as printing, copying, scanning, faxing, etc. Before the file 1624 is printed, the file 1624 must be converted by a print conversion driver 1616 into a printable format. For example, the file 1624 may be a Microsoft® Office® document, such as Word®, Powerpoint®, or Excel®, that may need to be converted into a printable format such as PCL, PS, PDF, XPS, and/or others, to be properly interpreted by the print engine 1424 of the print device 1400. It should be appreciated that other formats of the file, other printable formats, as well as any conversion techniques between any of the formats are envisioned.

In other embodiments, the processor 1602 executes instructions to determine file attribute data/descriptive data 1626 which may include file type 1644 (also referred to as format) data, font data 1646, and file size data 1648. The file conversion optimization component 1620 may cause the processor to process the file attributes 1626 and automatically determine that file format conversion is necessary for the file 1624 and automatically identifies least one of a plurality of file conversion drivers 1616, (and/or 1214, 1430, 1816, or 2204) as optimal for converting the file 1624. Additionally, the determination of the optimal conversion path 1634 causes the processor to execute the conversion driver selection component 1618. In some embodiments, the file 1624 is converted and sent to the print engine 1424 of a printing device 1400 to be printed.

According to various embodiments contemplated herein, the selection of the optimal file conversion path 1634 may be performed by a machine learning model 1614. The machine learning model 1614 may perform the conversion by selecting from one or a combination of more than one conversion drivers 1616, (and/or 1214, 1430, 1816, or 2204), which may also be referred to as conversion engines interchangeably. The conversion drivers 1616, (and/or 1214, 1430, 1816, or 2204) may be a local conversion driver, a remote conversion driver, or a combination of both. For example, the conversion driver may be located on the user interface 1600, on the printing device 1400, on a user device 1800, and/or on at least one cloud-based conversion driver located on a cloud computing system 2200, or a combination of the four.

In another embodiment, determining that format conversion is necessary further comprises employing machine learning artificial intelligence component 1614 to automatically identify least one of a plurality of file conversion drivers 1616, (and/or 1214, 1430, 1816, or 2204), as optimal for converting the file 1624, wherein the optimal file conversion driver 1616, (and/or 1214, 1430, 1816, or 2204), is selected to convert the file 1624. In some embodiments, the machine learning artificial intelligence component 1614 is configured to provide a real-time classification of at least one user submitted file 1624 and the available document conversion drivers 1616 (and/or 1430, 1616, 1816, 2204). In addition, the machine learning artificial intelligence model 1614 predicts an optimal file conversion path 1634 and designates the file conversion driver 1616, wherein the file conversion driver 1616 will convert at least one user submitted file 1624 into a printable electronic format.

In particular embodiments, a machine learning artificial intelligence model 1614 is configured to predict an optimal set of one or more file conversion control parameters 1636 for the process of converting a file 1624. The predicted optimal set of one or more control parameters 1636 are derived using a trained machine learning artificial intelligence model 1614. This trained machine learning artificial intelligence model 1614 is configured to provide a real-time classification of the optimal file conversion path 1634. Further, the real-time classification of the optimal file conversion path 1634 is determined from the machine learning artificial intelligence model 1614 detecting file attributes 1626 and available file conversion drivers 1616 (and/or 1214, 1430, 1816, 2204). Then the machine learning artificial intelligence model 1614 causes the processor 1602 to execute file conversion optimization component 1620 to determine which of the devices connected to the print conversion system has an optimal conversion driver 1616 (and/or 1214, 1430, 1816, 2204). The machine learning artificial intelligence model 1614 also causes the processor 1602 to convert the file 1624 using the optimal file conversion driver path 1634 and conversion control parameters 1636. Here, the machine learning artificial intelligence model 1614 adjusts the one or more file conversion control parameters 1636 in real-time. Additionally, the machine learning 1614 artificial intelligence provides real-time feedback, to the user about file conversion availability.

In some embodiments, the file conversion optimization component 1620 may cause the processor to constantly or periodically monitor the parameters (such as, but not limited to, device type, device memory capacity, network connection strength, printer que size, printer toner availability, printer paper availability, printer status, printer error messages, and the like) of the devices communicatively connected to the print file conversion system 1000. The file conversion optimization component 1620 may monitor file conversion control parameters 1636 for the print file conversion system 1000 such as available print conversion drivers 1616 (and/or 1214, 1430, 1816, 2204), print conversion efficiency, user submitted files 1624, file attribute data 1626, printer data 1628, network status data 1630, connected devices data 1632 such as printer availability, print job history 1638, print job identifier 1640, and job profile 1642, and other aspects that may indicate that a change in optimization parameters is or will be required. If a parameter change or adjustment is required, the file conversion optimization component 1620 may automatically adjust the any of the indicated file conversion control parameters 1636 for optimization.

In a particular embodiment, the file conversion optimization component 1620 may cause the processor 1602 to execute instructions 1610 to create a unique print job identifier 1640 based on user submitted file's attributes 1626 and available conversion drivers 1616 (and/or 1214, 1430, 1816, 2204). Further, the machine learning model 1614 is configured to automatically detect and classify file attribute data 1626 that defines the properties of the file 1624, automatically associate the descriptive data 1626 with the unique print job identifier 1640. Here, the file attribute data 1626 and associated print job identifier 1640 are stored as a job profile 1642; automatically classifying available conversion drivers 1616 (and/or 1214, 1430, 1816, 2204) and identifying an optimal file conversion 1448, wherein classifying parameters for the file attribute data 1626 and the available file conversion drivers 1616 (and/or 1214, 1430, 1816, 2204) indicates the location of the file conversion driver 1616 (and/or 1214, 1430, 1816, 2204); and automatically converting the file with the optimal file conversion driver 1616 (and/or 1214, 1430, 1816, 2204). The file attribute 1626 may be file format or type 1644, file size 1648, file fonts 1646, or a combination of the three. Additionally, the machine learning 1614 artificial intelligence may be configured to monitor a history 1638 of previous jobs stored as profiles 1642, wherein the history is used to forecast an optimal conversion path 1634.

It should be appreciated that FIGS. 1C, 1C-1, and 1C-2 represent a generalized schematic illustration and that other components and/or entities may be added or existing components and/or entities may be removed or modified. Accordingly, the method of using machine learning artificial intelligence to optimize file conversion for printing can be applied in different print-processing or computational environments.

Figure 1D:
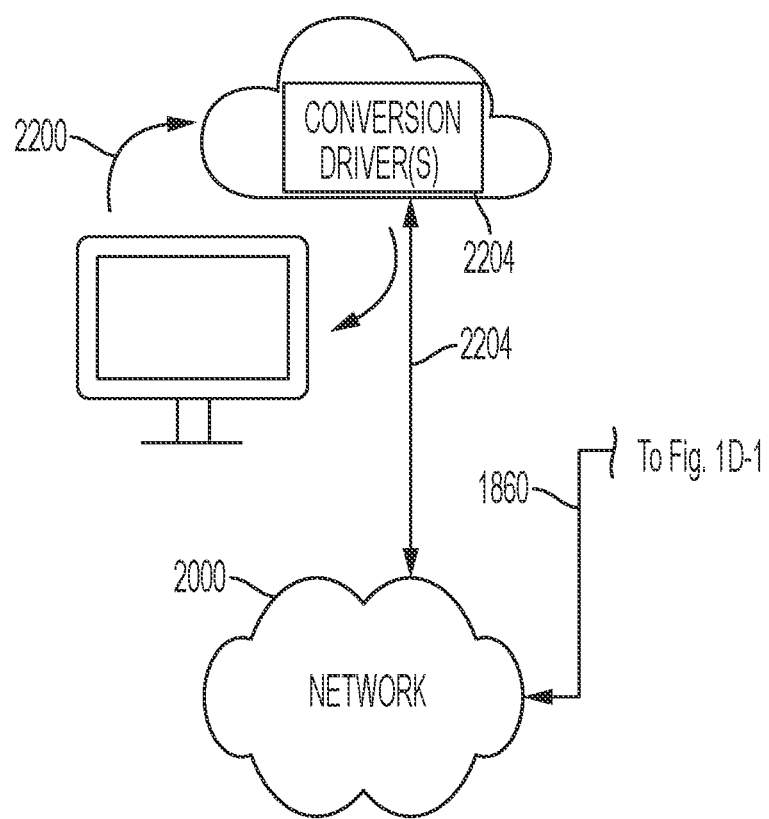
Figures 1, 1D:
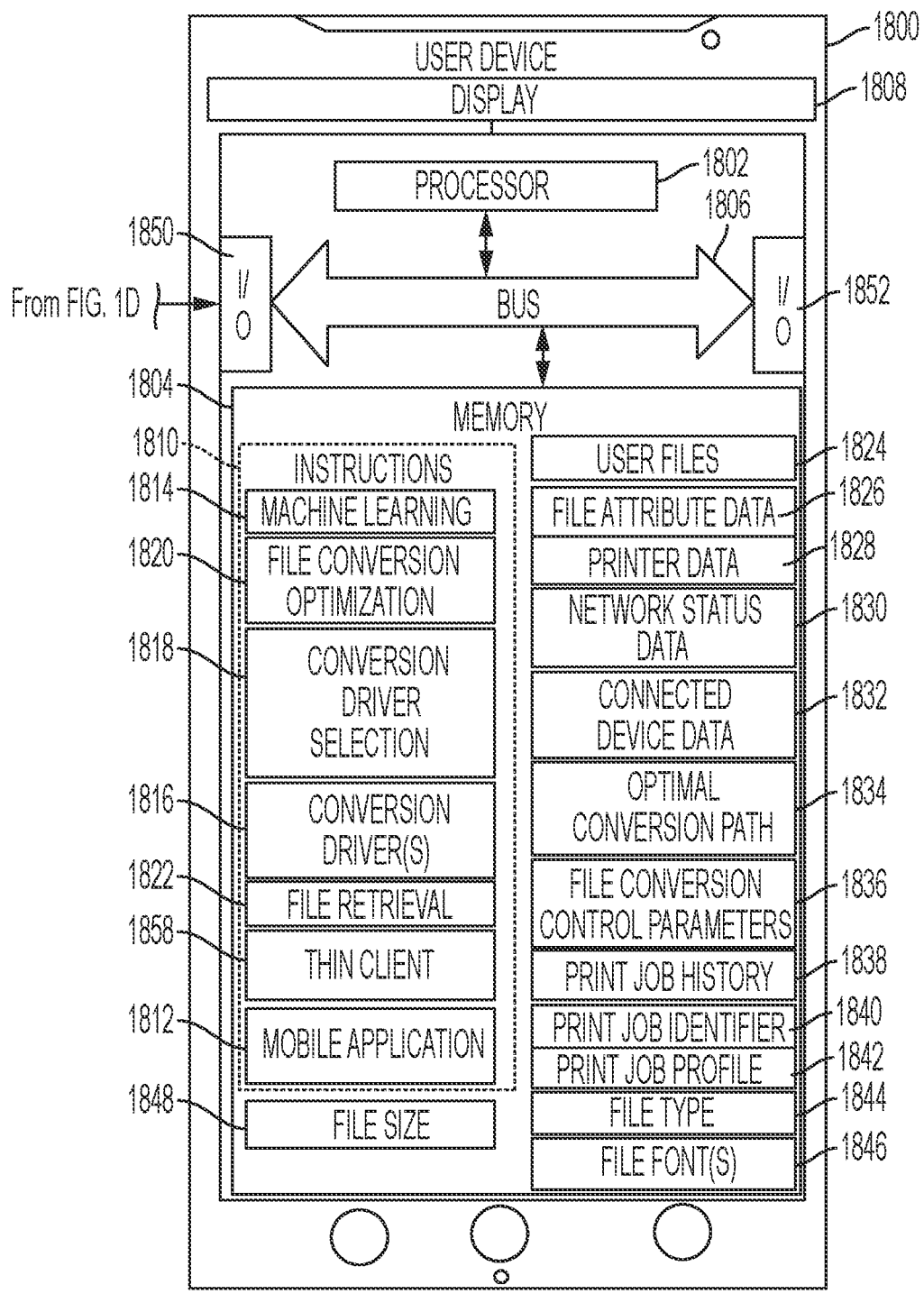

FIGS. 1D and 1D-1 provide an example illustration of a user device 1800 representative of the user device 1800 depicted in FIG. 1A. The user device 1800 may include a processor 1802, which executes one or more instructions 1810 in the performance of an exemplary method discussed below. The user device 1800 may further include a memory 1804 storing the instruction 1810 in data communication with the processor 1802 via a system bus 1806. The processor 1802 of the user device 1800 may be in data communication with the print conversion optimization system 1200, printing device 1400, and/or user interface 1600 via input/output (I/O) interface devices 1850 and 1852, through a communication link 1860. In one embodiment, the bi-directional communication is data communication utilizing a cellular data network, e.g., $3^{rd}$ generation mobile phone standards (3G), $4^{th}$ generation standards (4G, 4G LTE, WiMax), EV-DO, standalone data protocols, and the like. In such an embodiment, the user device 1800 communicates with the print conversion optimization system 1200, printing device 1400, and/or user interface 1600 using the internet network 2000.

The user device 1800 may further include a display 1808 suitably configured to display data to an associated user, receive input from the associated user, and the like. In some embodiments, the display 1808 of the user device 1800 may be configured as a touchscreen display capable of receiving user instructions via user contact on the display, e.g., LCD, AMOLED, LED, RETINA, etc., types of touchscreen displays. For example, the display 1808 may be capable of displaying printer options and print job feedback messages, a thin client 1858 (e.g., web-enabled browser), a graphical user interface associated with a printing application 1812, and the like. The application 1812 for facilitating document printing from a user device, in accordance with an embodiment, may be executed by processor 1802. During operation, the application program can be loaded into memory 1804 and executed by processor 1802. As a result, user device 1800 can perform the functions described above.

The memory 1804 may represent any type of non-transitory computer readable medium such as random-access memory (RAM), read only memory (ROM), magnetic disk or tape, optical disk, flash memory, or holographic memory. In one embodiment, the memory 1804 comprises a combination of random-access memory and read only memory. In some embodiments, the processor 1802 and memory 1804 may be combined in a single chip. The network interface(s) 1850, 1852 allow the user device 1800 to communicate with other devices via a communications network and may comprise a modulator/demodulator (MODEM). Memory 1804 may store data the processed in the method as well as the instructions 1810 for performing the exemplary method. The processor 1802 can be variously embodied, such as by a single core processor, a dual core processor (or more generally by a multiple core processor), a digital processor and cooperating math coprocessor, a digital controller, or the like.

In a particular embodiment, the processor 1802 may also communicate with the machine learning component 1814 that may be configured to execute control logic and perform data processing to perform the functions and techniques as discussed herein. For example, the machine learning component 1814 may determine whether to convert the document locally or in the cloud-based network based on the flowchart of FIGS. 2A-2C.

In particular embodiments, the file conversion optimization component 1820 may cause the processor 1802 to execute instructions from the file retrieval component 1822 a user submitted file 1824, determine if conversion is necessary for printing, convert the file into a printer readable format and transmit the file to one or more printing devices 1400. The printing device 1400 may be a standalone single function device such as a dedicated printer or a multifunctional device (as discussed with respect to FIGS. 1C, 1C-1, and 1C-2). Before the document is printed, the document must be converted by a print conversion driver 1816 into a printable format. For example, the file may be a Microsoft® Office® document, such as Word®, Powerpoint®, or Excel®, that may need to be converted into a printable format such as PCL, PS, PDF, XPS, and/or others, to be properly interpreted by the print engine 1424 of the print device 1400 (FIGS. 1C, 1C-1, and 1C-2). It should be appreciated that other formats of the file, other printable formats, as well as any conversion techniques between any of the formats are envisioned.

In other embodiments, the processor 1802 executes instructions 1810 to determine file attribute data/descriptive data 1826 which may include file type 1844 (also referred to as format) data, font data 1846, and file size data 1848. The file conversion optimization component 1820 cause the processor 1802 to process the file attributes 1826 and automatically determine that file format conversion is necessary for the file and automatically identifies least one of a plurality of file conversion drivers 1816, 1214, 1430, 1616, or 2204 as optimal for converting the file. Additionally, the determination of the optimal conversion path 1834 causes the processor 1802 to execute the conversion driver selection component 1818. In some embodiments the file is converted and sent to the print engine 1424 of a printing device 1400 to be printed.

According to various embodiments contemplated herein, the selection of the optimal file conversion path 1834 may be performed by a machine learning model 1814. The machine learning model 1814 may perform the conversion by selecting from one or a combination of more than one conversion drivers 1816 (and/or 1214, 1430, 1616, or 2204), which may also be referred to as conversion engines interchangeably. The conversion drivers 1816 (and/or 1214, 1430, 1616, or 2204) may be a local conversion driver, a remote conversion driver, or a combination of both.

In another embodiment, determining that format conversion is necessary further comprises employing machine learning artificial intelligence model 1814 to automatically identify least one of a plurality of file conversion drivers 1816 (and/or 1214, 1430, 1616, or 2204), as optimal for converting the file 1824, wherein the optimal file conversion driver 1816 (and/or 1214, 1430, 1616, or 2204), is selected to convert the file 1824. In some embodiments, the machine learning artificial intelligence is configured to provide a real-time classification of at least one user submitted file 1824 and the available document conversion drivers 1816 (and/or 1214, 1430, 1616, 2204). In addition, the machine learning artificial intelligence model 1814 predicts an optimal file conversion path 1834 and designates the file conversion driver 1816 (and/or 1214, 1430, 1616, or 2204), wherein the file conversion driver 1816 (and/or 1214, 1430, 1616, or 2204) will convert at least one user submitted file 1824 into a printable electronic format.

In particular embodiments, a machine learning artificial intelligence model 1814 is configured to predict an optimal set of one or more file conversion control parameters 1836 for the process of converting a file 1824. The predicted optimal set of one or more control parameters 1836 are derived using a trained machine learning artificial intelligence. This trained machine learning artificial intelligence model 1814 is configured to provide a real-time classification of the optimal file conversion path 1834. Further, the real-time classification of the optimal file conversion path 1834 is determined from the machine learning model 1814 detecting file attributes 1826 and available file conversion drivers 1816 (and/or 1214, 1430, 1616, 2204). Then the machine learning artificial intelligence model 1814 causes the processor 1802 to execute file conversion optimization component 1820 to determine which of the devices connected to the print conversion system has an optimal conversion driver 1816 (and/or 1214, 1430, 1616, or 2204). The machine learning artificial intelligence model 1814 also causes the processor 1802 to execute instructions from the conversion driver component 1816 to perform the file conversion using the optimal file conversion driver path 1834 and conversion control parameters 1836. Here, the machine learning artificial intelligence model 1814 adjusts the one or more file conversion control parameters 1836 in real-time. Additionally, the machine learning artificial intelligence model 1814 provides real-time feedback, to the user about file conversion availability.

In some embodiments, the file conversion optimization component 1820 may cause the processor 1802 to constantly or periodically monitor the parameters (such as, but not limited to, device type, device memory capacity, network connection strength, printer que size, printer toner availability, printer paper availability, printer status, printer error messages, and the like) of the devices communicatively connected to the print file conversion system 1000. The file conversion optimization component 1820 may monitor file conversion control parameters 1836 for the print file conversion system 1000 such as available print conversion drivers 1816 (and/or 1214, 1430, 1616, 2204), print conversion efficiency, user submitted files 1824, file attribute data 1826, printer data 1828, network status data 1830, connected devices data 1832 such as printer availability, print job history 1838, print job identifier 1840, and job profile 1842, and other aspects that may indicate that a change in optimization parameters is or will be required. If a parameter change or adjustment is required, the file conversion optimization component 1820 may automatically adjust the any of the indicated file conversion control parameters 1836 for optimization.

In a particular embodiment, the file conversion optimization component 1820 may cause the processor to execute instructions 1810 to create a unique print job identifier 1840 based on user submitted file's attributes 1826 and available conversion drivers 1816 (and/or 1214, 1430, 1616, 2204). Further, the machine learning model 1814 is configured to automatically detect and classify file attribute data 1826 that defines the properties of the file 1824, automatically associate the file attribute data 1826 with the unique print job identifier 1840. Here, the descriptive data 1826 and associated print job identifier 1840 are stored as a job profile 1842; automatically classifying available conversion drivers 1816 (and/or 1214, 1430, 1616, or 2204) and identifying an optimal file conversion driver 1816 (and/or 1214, 1430, 1616, or 2204), wherein classifying parameters for the file attribute data 1826 and the available file conversion drivers 1816 (and/or 1214, 1430, 1616, or 2204) indicates the location of the file conversion driver 1816 (and/or 1214, 1430, 1616, or 2204) and automatically converts the file with the optimal file conversion driver 1816 (and/or 1214, 1430, 1616, or 2204). The file attribute data 1826 may be file format or type 1844, file size 1848, file fonts 1846, or a combination of the three. Additionally, the machine learning 1814 artificial intelligence may be configured to monitor a history 1838 of previous jobs stored as profiles 1842, wherein the history is used to forecast an optimal conversion path 1834.

FIGS. 1A to 1D-1 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including, for example, Windows, Macintosh, UNIX, LINUX, and the like.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

Figure 2A:
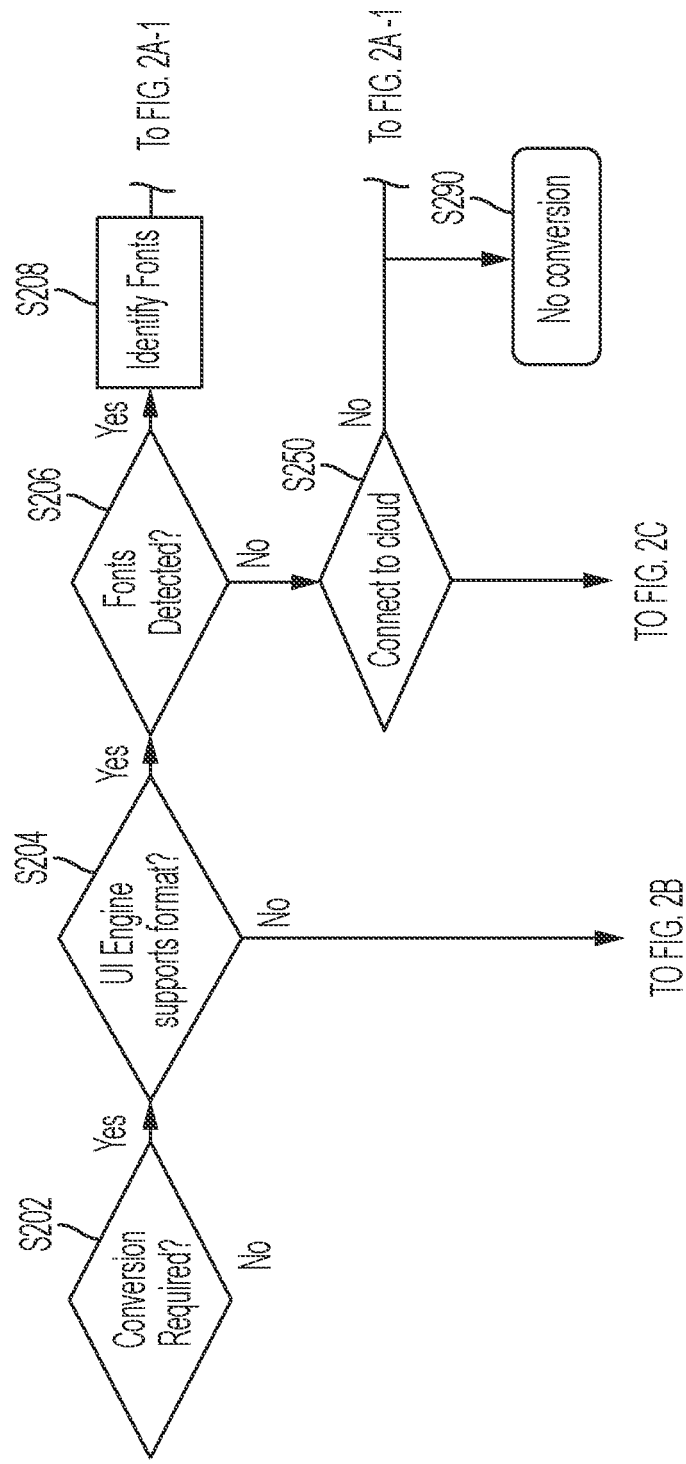
FIGS. 2A-C is a flowchart showing a workflow for determining the optimal conversion path according to one aspect of the present disclosure.
Figures 1, 2A:
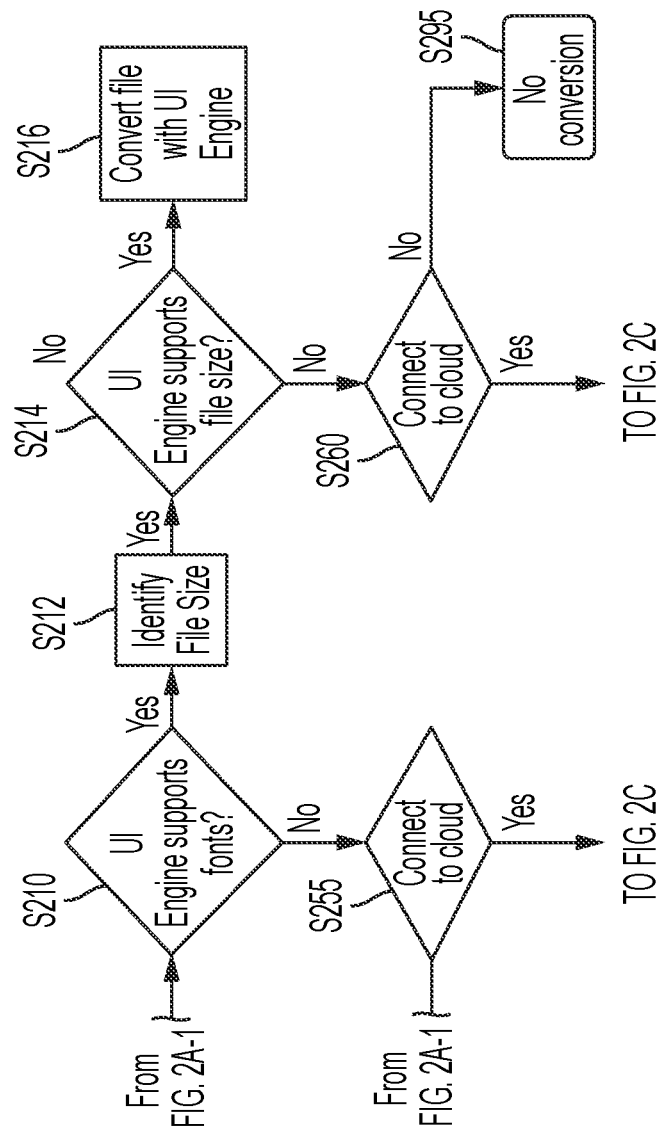

FIGS. 2A to 2A-1 depict a flowchart detailing the print conversion optimization system 1200 for converting the files into a printable format. Machine learning or statistical methods are used to incorporate trends and predictable or recurring changes into the conversion strategies. The method starts when a file 1222 is submitted for printing that needs to be converted into a printable format (YES at S202). The system 1200 analyzes the format 1242 of the file 1222 and determines if the UI Conversion Engine (also described as a driver and can refer to any type of hardware, software, or combination thereof that can be configured to convert an electronic file or document in a first format into another electronic file or document in a second format) 1616 supports the format 1242. If the UI Conversion Engine 1616 does support the file format (YES at S204), the system 1200 then analyzes the original file 1222 for fonts 1244. If the system 1200 cannot detect (NO at S206) fonts 1244 then the system will attempt to connect to the Cloud Based Conversion Engine 2204. The file 1222 will be converted with the Cloud Based Conversion Engine 2204 if connection to the cloud is established (YES at S250) then the file 1222 is converted with the Cloud Based Conversion Engine 2204. However, if there is no connection (NO at S250) to the cloud 2200, then the conversion fails S290. If fonts 1244 are found (YES at S206), then the system identifies the fonts 1244 detected S208 and determines whether the UI Conversion Engine 1616 supports (YES at S210) the identified fonts 1244. In response to supporting (YES at S210) the fonts 1244 the system then analyzes S212 the file size 1246. If the UI Conversion Engine 1616 does not support (NO at S210) the fonts 1244, then the system 1200 will attempt to connect to the cloud 2200. Failure to connect (No at S255) to the cloud 2200 results in no conversion S630, but if the connection to the cloud 2200 is successful (YES at S625) (FIG. 2C) then the file 1222 will be converted with the Cloud Based Conversion Engine 2204. If the UI Conversion Engine 1616 supports (YES at S214) the file size 1246, then machine learning component 1212 will determine S216 that the UI Conversion Engine 1616 is most optimal conversion engine is to convert the file 1222. If the UI Conversion Engine 1616 does not support (NO at S214) the file size 1246 then the system 1200 will attempt to connect to the Cloud Based Conversion Engine 2204. The file 1222 will be converted S590 (FIG. 2C) with the Cloud Based Conversion Engine 2204 if connection to the cloud 2200 is established (YES at S260). However, if there is no connection (NO at S260), to the cloud 2200 then the conversion fails S295.

Figure 2B:
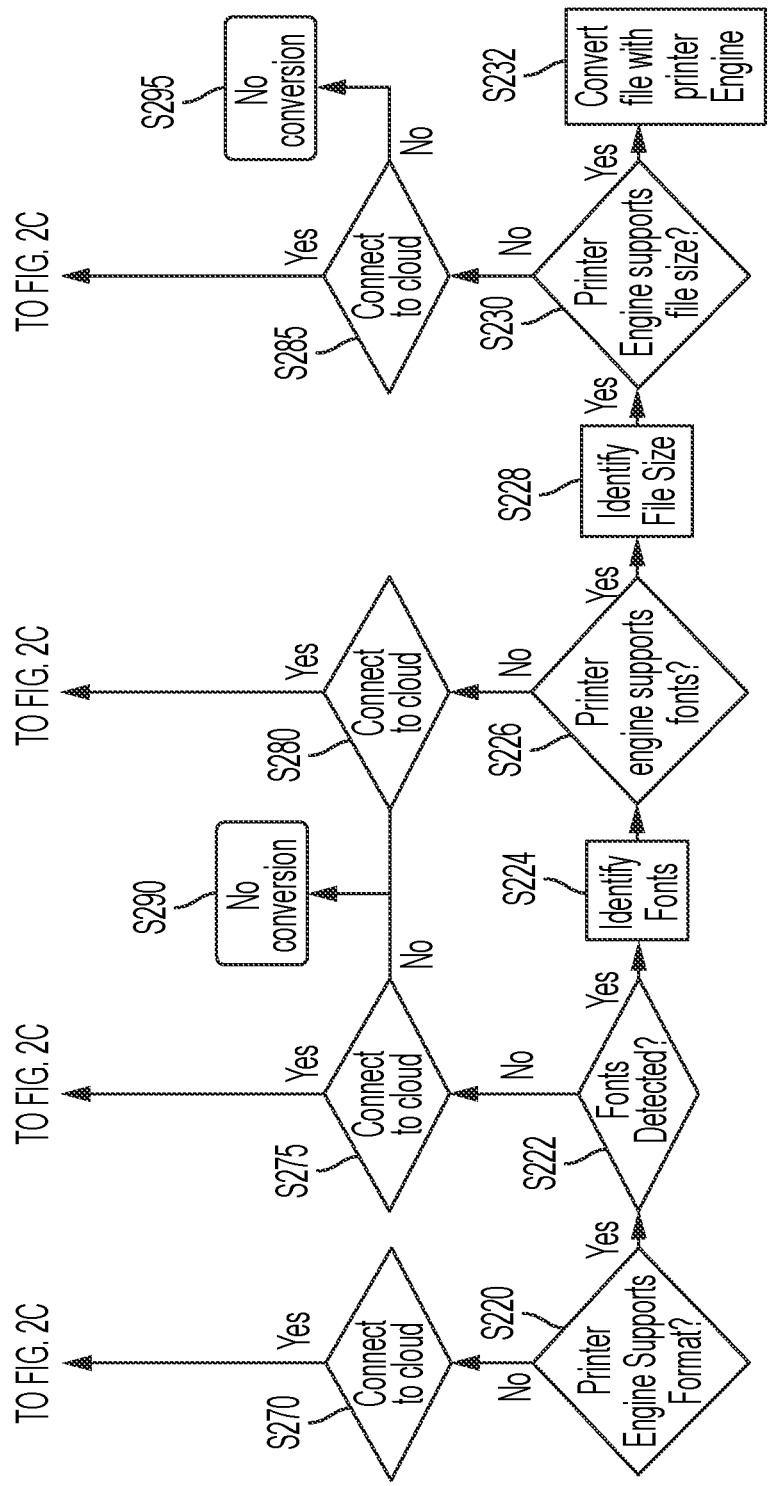

Continuing with FIG. 2B, if the machine learning component 1212 determines that the UI Conversion Engine 1616 does not support the file format 1242 (NO at S204) the system 1200 will then analyze whether the Printer Conversion Engine 1430 supports the file format 1242. If the Printer Conversion Engine 1430 does support (YES at S220) the file format 1242 the system 1200 will detect fonts (YES at S222) and identify S224 the fonts 1244 contained in the file 1222. If the system 1200 cannot detect (NO at S222) fonts 1244 then the system 1200 will attempt to connect to the cloud S270. The file 1222 will be converted S248 (FIG. 2C) with the Cloud Based Conversion Engine 2204 if connection is successful (YES at S605), however if there is no connection (NO at S605) to the cloud 2200 then the conversion fails S290. If the fonts 1244 are successfully detected and identified, then the machine learning component 1212 will determine whether the Printer Conversion Engine 1430 supports the fonts 1244. After the machine learning component 1212 determines the Printer Conversion Engine 1430 does support 1244 (YES at S226) the fonts 1244 the system 1200 will then identify S228 the file size 1246. If the Printer Conversion engine 1430 does not support (NO at S226) the fonts 1244 then the file 1222 will be converted with the Cloud Conversion Engine 2204 so long as a successful cloud connection is established S285. If the Printer Conversion Engine 1430 supports (YES at S230) the file size 1246, then the file 1222 will be converted S232 with the Printer Conversion Engine 1430. However, the machine learning component 1212 will decide to convert S248 (FIG. 2C) the file 1222 with the Cloud Based Conversion Engine 2204, in the event that the Printer Conversion Engine 1430 does not support (NO at S230) the file size 1246.

Figure 2C:
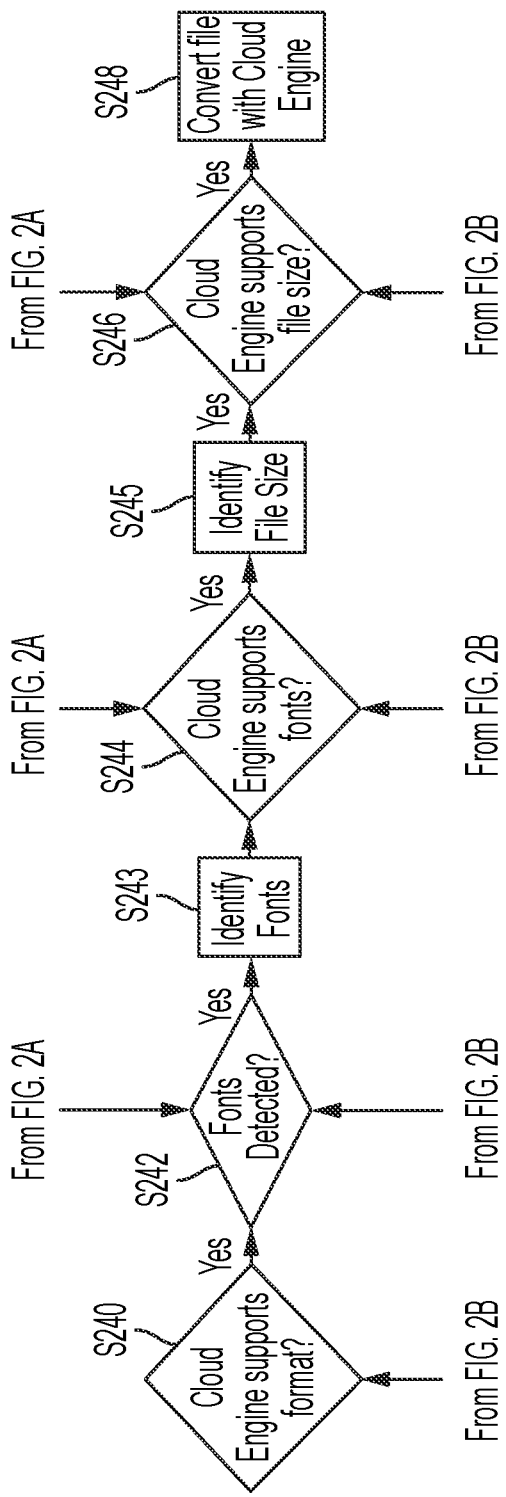

Continuing with FIG. 2C, if the machine learning component 1212 determines that the UI Conversion Engine 1616 does not support (NO at S204) the file format 1242 and the machine learning component 1212 determines the Printer Conversion Engine 1430 doesn't support (NO at S220) the file format 1242 either, then the system 1200 will connect S575 to the cloud 2200. The file 1222 will be converted S595 with the Cloud Based Conversion Engine 2204 if the Cloud Based Conversion Engine 2204 supports (YES at S580) the file format 1242 and the Cloud Based Conversion Engine 2204 supports (YES at S590) the file size 1246.

It is to be appreciated that in the event that one conversion driver does not support one or a combination of the file format, file size, file fonts, and/or other conversion factors then the remaining conversion drivers may be used in conjunction with the conversion driver that worked. For example, in the event that the UI Conversion Engine supports the file format and the fonts but not the file size, the format and fonts of the file would be converted with the UI Conversion Engine and the fonts could be converted with either the Printer Conversion Engine or the Cloud Based Conversion Engine. In another example, the UI Conversion Engine may support conversion of the file format but not fonts or file size, then the Printer Conversion Engine or Cloud Based Conversion Engine or a combination of both could convert the file fonts and file size into a printable format.

Therefore, the machine learning component is operable to determine the most optimal conversion path for print jobs submitted by utilizing data retained from previous conversions to apply to subsequent print jobs. The disclosure contemplates that select conversion actions are not needed for every print job while they may be required for certain types of print jobs. By tracking a history of conversions—more particularly the conversion engines used and the reasons for suing such conversion engines—the machine learning component learns which conversion engines are effective for the formats, fonts, file size, and other characteristics of print jobs submitted.

This combined knowledge will yield a more intelligent use of automatic conversions and provides a system with an ability to recommend the optimal conversion path at the appropriate times. By determining and/or learning document predetermined settings, the machine learning component can determine how and if a document needs to be processed by which conversion engine. If the learned data indicates that a conversion is appropriate, the system will automatically activate the proper conversion engine necessary to print the proposed document in the most efficient manner.

Some portions of the detailed description herein are presented in terms of algorithms and symbolic representations of operations on data bits performed by conventional computer components, including a central processing unit (CPU), memory storage devices for the CPU, and connected display devices. These algorithmic descriptions and representations are the means used by those skilled in the data processing arts to most effectively convey the substance of their work to others skilled in the art. An algorithm is generally perceived as a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be understood, however, that all of these and similar terms are to be associated with the appropriate physical quantities and are merely convenient labels applied to these quantities. Unless specifically stated otherwise, as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The exemplary embodiment also relates to an apparatus for performing the operations discussed herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, and each coupled to a computer system bus.

The algorithms and displays presented herein are not inherently related to any particular computer or other apparatus. Various general-purpose systems may be used with programs in accordance with the teachings herein, or it may prove convenient to construct more specialized apparatus to perform the methods described herein. The structure for a variety of these systems is apparent from the description above. In addition, the exemplary embodiment is not described with reference to any particular programming language. It will be appreciated that a variety of programming languages may be used to implement the teachings of the exemplary embodiment as described herein.

[A machine-readable medium includes any mechanism for storing or transmitting information in a form readable by a machine (e.g., a computer). For instance, a machine-readable medium includes read only memory ("ROM"); random access memory ("RAM"); magnetic disk storage media; optical storage media; flash memory devices; and electrical, optical, acoustical or other form of propagated signals (e.g., carrier waves, infrared signals, digital signals, etc.), just to mention a few examples.

The methods illustrated throughout the specification, may be implemented in a computer program product that may be executed on a computer. The computer program product may comprise a non-transitory computer-readable recording medium on which a control program is recorded, such as a disk, hard drive, or the like. Common forms of non-transitory computer-readable media include, for example, floppy disks, flexible disks, hard disks, magnetic tape, or any other magnetic storage medium, CD-ROM, DVD, or any other optical medium, a RAM, a PROM, an EPROM, a FLASH-EPROM, or other memory chip or cartridge, or any other tangible medium from which a computer can read and use.

Alternatively, the method may be implemented in transitory media, such as a transmittable carrier wave in which the control program is embodied as a data signal using transmission media, such as acoustic or light waves, such as those generated during radio wave and infrared data communications, and the like.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method for optimizing the conversion of a file into a printable electronic format, the method comprising:
   receiving at least one associated user print request and at least one user submitted file associated with the user request;
   executing instructions comprising:
   determining that format conversion is necessary for the file;
   automatically identifying at least one of a plurality of file conversion drivers as optimal for converting the file and optimizing a file conversion path;
   converting the file into a printer readable format with the optimal file conversion driver; and
   transmitting the converted file to a print engine for printing;
   wherein at least one hardware processor is configured to execute the instructions to print the file, and wherein the receiving, optimizing, determining, identifying, converting, and transmitting is performed by the at least one hardware processor,
   wherein optimizing the file conversion path further comprises employing machine learning artificial intelligence for automatically determining that format conversion is necessary,
   wherein the machine learning artificial intelligence causes the hardware processor to execute conversion driver instructions to perform the file conversion using an optimal file conversion driver path and one or more conversion control parameters and adjust the one or more conversion control parameters in real-time,
   wherein the machine learning artificial intelligence provides real-time feedback to the user about file conversion availability.

2. The method of claim 1, wherein determining that format conversion is necessary further comprises:

employing the machine learning artificial intelligence to identify at least one of a plurality of file conversion drivers as optimal for converting the file; and selecting an optimal file conversion driver to convert the file.

3. The method of claim 1, wherein the machine learning artificial intelligence is configured for:

providing a real-time classification of at least one user submitted file and the available document conversion drivers;

predicting an optimal file conversion path; and designating the file conversion driver, wherein the file conversion driver will convert the user submitted file into a printable electronic format.

4. The method of claim 1, wherein the method further comprises:

configuring the machine learning artificial intelligence for:

automatically detecting and classifying descriptive data that defines the properties of the file;

creating a unique print job identifier;

associating the descriptive data with the unique print job identifier, wherein the descriptive data and associated print job identifier are stored as a job profile;

automatically classifying available conversion drivers and identifying an optimal file conversion driver, wherein classifying parameters for the descriptive data and the available file conversion drivers indicates the location of the file conversion driver; and converting the file with the optimal file conversion driver.

5. The method of claim 4, wherein the descriptive data is at least one of file format, file size, or file fonts.

6. The method of claim 4, wherein the method further comprises configuring the machine learning artificial intelligence for monitoring a history of previous jobs stored as profiles, wherein the history is used to forecast an optimal conversion path.

7. The method of claim 4, further comprising determining which of devices connected to the print conversion system has an optimal conversion driver.

8. The method of claim 1, wherein the conversion driver at least one of a local conversion driver, or a remote conversion driver.

9. The method of claim 1, wherein the conversion driver at least one of an associated user interface conversion driver, a printer conversion driver, or a cloud-based conversion driver.

10. A system for optimizing file conversion into a printable electronic format, the system comprising:

a print conversion optimization system, comprising:

a processor in communication with memory, wherein the memory stores instructions which are executed by the processor to:

receive at least one user print request and at least one user submitted file associated with the user request;

optimize the conversion of a file by executing instructions comprising:

determine that format conversion is necessary for the file;

automatically identify at least one of a plurality of file conversion drivers as optimal for converting the file and optimize a file conversion path;

convert the file with said optimal file conversion driver; and print said converted file, wherein optimizing the file conversion path further comprises employing machine learning artificial intelligence for automatically determining that format conversion is necessary, wherein the machine learning artificial intelligence causes the processor to execute conversion driver instructions to perform the file conversion using an optimal file conversion driver path and one or more conversion control parameters and adjust the one or more conversion control parameters in real-time, wherein the machine learning artificial intelligence provides real-time feedback to the user about file conversion availability.

11. The system of claim 10, wherein the system further comprises a printing device comprising:

a user interface; and a printer controller having a processor in communication with memory, wherein the processor that executes instructions stored in a memory for the print engine to print the converted file.

12. The system of claim 10, wherein the machine learning artificial intelligence is configured for determining that format conversion is necessary for the file.

13. The system of claim 12, further comprising determining which of the devices connected to the print conversion system has an optimal conversion driver.

14. The system of claim 12, wherein the machine learning artificial intelligence is further configured to identify least one of a plurality of file conversion drivers as optimal for converting the file; and convert the file with the selected conversion driver.

15. The system of claim 12, wherein the machine learning artificial intelligence is further configured to:

provide a real-time classification of at least one user submitted file and the available document conversion drivers;

predict an optimal file conversion path; and designate the file conversion driver, wherein the file conversion driver will convert the user submitted file into a printable electronic format.

16. The system of claim 12, wherein the machine learning artificial intelligence is further configured to:

automatically detect and classify descriptive data that defines the properties of the file;

associate the descriptive data with the unique print job identifier, wherein the descriptive data and associated print job identifier are stored as a job profile;

automatically classify available conversion drivers and identify an optimal file conversion driver, wherein classifying parameters for the descriptive data and the available file conversion drivers indicates the location of the optimal file conversion driver; and convert the file with the optimal file conversion driver.

17. The system of claim 16, wherein the descriptive data at least one of file format, file size, or file fonts.

18. The system of claim 14, wherein the machine learning artificial intelligence is further configured to monitor a history of previous jobs stored as profiles, wherein the history is used to forecast an optimal conversion path.

* * * * *